US010638030B1

(12) United States Patent
Sinharoy et al.

(10) Patent No.: US 10,638,030 B1
(45) Date of Patent: Apr. 28, 2020

(54) ANGULAR FOCUS STACKING

(71) Applicant: Southern Methodist University, Dallas, TX (US)

(72) Inventors: Indranil Sinharoy, Dallas, TX (US); Marc P. Christensen, McKinney, TX (US); Prasanna Rangarajan, Dallas, TX (US)

(73) Assignee: Southern Methodist University, Dallas, TX (US)

( * ) Notice: Subject to any disclaimer, the term of this patent is extended or adjusted under 35 U.S.C. 154(b) by 0 days.

(21) Appl. No.: 15/883,799

(22) Filed: Jan. 30, 2018

Related U.S. Application Data

(60) Provisional application No. 62/452,679, filed on Jan. 31, 2017.

(51) Int. Cl.
| | |
|---|---|
| *H04N 5/232* | (2006.01) |
| *H04N 5/445* | (2011.01) |
| *G02B 7/04* | (2006.01) |
| *H04N 13/207* | (2018.01) |
| *H04N 13/271* | (2018.01) |

(52) U.S. Cl.
CPC ........... *H04N 5/23212* (2013.01); *G02B 7/04* (2013.01); *H04N 5/44504* (2013.01); *H04N 13/207* (2018.05); *H04N 13/271* (2018.05)

(58) Field of Classification Search
None
See application file for complete search history.

(56) References Cited

U.S. PATENT DOCUMENTS

| | | | | |
|---|---|---|---|---|
| 2,195,750 A * | 4/1940 | Mohr | .................... | G03B 15/00 352/44 |
| 3,655,260 A * | 4/1972 | Bartucci | ................ | G02B 13/00 353/69 |
| 4,474,436 A * | 10/1984 | Itoh | ........................ | G02B 15/16 359/681 |
| 5,642,223 A * | 6/1997 | Hasushita | .............. | G02B 13/00 359/554 |
| 8,811,808 B2 * | 8/2014 | Zellan | .................... | G03B 17/14 396/50 |
| 9,001,256 B2 * | 4/2015 | Shimomura | ........... | G02B 15/14 348/335 |

(Continued)

FOREIGN PATENT DOCUMENTS

| | | | | |
|---|---|---|---|---|
| JP | 11196315 | A | * | 7/1999 |
| JP | 2005175852 | A | * | 6/2005 |

OTHER PUBLICATIONS

Indranil Sinharoy, Prasanna Rangarajan, and Marc P. Christensen, "Geometric model for an independently tilted lens and sensor with application for omnifocus imaging," Appl. Opt. 56, D37-D46 (2017) (Year: 2017).*

(Continued)

*Primary Examiner* — Quan Pham
(74) *Attorney, Agent, or Firm* — Fish & Richardson P.C.

(57) ABSTRACT

The present disclosure includes a method for operating a camera. A lens or a sensor of the camera is rotated about an axis to a plurality of positions, and the rotation generates a rotation of a plane of sharp focus of the camera. At each of the plurality of positions, an image is captured. For each image, a substantially in-focus region is determined. The substantially in-focus regions are combined to generate a composite image.

10 Claims, 25 Drawing Sheets

(56) References Cited

U.S. PATENT DOCUMENTS

| | | | | |
|---|---|---|---|---|
| 2006/0289734 | A1* | 12/2006 | Truche | G03B 3/10 |
| | | | | 250/281 |
| 2007/0025640 | A1* | 2/2007 | Hillis | H04N 1/482 |
| | | | | 382/284 |
| 2015/0116691 | A1* | 4/2015 | Likholyot | G01S 17/89 |
| | | | | 356/4.01 |
| 2016/0267349 | A1* | 9/2016 | Shoaib | G06T 5/50 |
| 2018/0041709 | A1* | 2/2018 | Konttori | H04N 5/2257 |
| 2018/0067296 | A1* | 3/2018 | Sugie | G02B 27/0075 |

OTHER PUBLICATIONS

Boxall [online], "Always in Focus: This Camera Module Turns your Next Smartphone into a Lytro," DigitalTrends.com: Mobile, Feb. 26, 2013, [retrieved on Apr. 5, 2019], retrieved from: URL<Always in Focus: This Camera Module Turns your Next Smartphone into a Lytro>, 15 pages.

Lensbaby.com [online], "Composer Pro II with Edge 50 Optic," available on or before Mar. 14, 2016, via Internet Archive: Wayback Machine URL <https://web.archive.org/web/20160314163653/http://lensbaby.com/usa/sim-e50.php>, [retrieved on Apr. 25, 2019], retrieved from URL<http://lensbaby.com/usa/sim-e50.php>, 1 page.

Lytro.com [online], "Lytro About," available on or before Jan. 31, 2017, via Internet Archive: Wayback Machine URL <https://web.archive.org/web/20170216205453/https://www.lytro.com/about>, [retrieved on Apr. 25, 2019], retrieved from URL <https://www.lytro.com/about>, 4 pages.

Miau et al., "Focal Sweep Videography with Deformable Optics," IEEE International Conference on Computational Photography (ICCP), IEEE, Apr. 2013, 8 pages.

No Author Listed [online], "Focal Sweep Camera (Fosera)," Cave Laboratory: Projects, [retrieved on Apr. 25, 2019], retrieved from: URL<http://www1.cs.columbia.edu/CAVE/projects/focal_sweep_camera/>, 2 pages.

\* cited by examiner

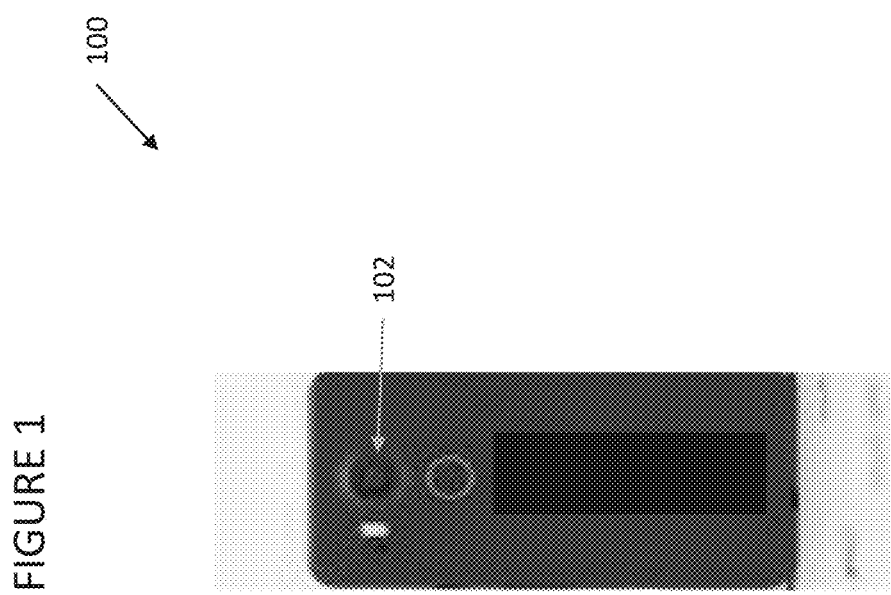

ANGULAR FOCUS STACKING

CROSS-REFERENCE TO RELATED APPLICATION

This application claims benefit of priority of U.S. Provisional Application No. 62/452,679, filed on Jan. 30, 2017, the entire contents of which is hereby incorporated by reference for all purposes.

TECHNICAL FIELD

This invention relates to imaging, and more particularly to angular focus stacking.

BACKGROUND

Typical cameras have a limited depth of field (DOF), which often causes blur and loss of image detail. Some image refocusing techniques may improve the plane of focus and DOF of an image during or after the image capture. One way to (e.g. post-factum) refocus is to instant capture the entire light field by a plenoptic camera (4D data capture). However, this technique can lead to a significant reduction in image resolution. Other refocusing techniques use 'focal stack' approaches (3D data capture). 'Focal stack' is a set of images of the same scene captured at different focus settings and used to facilitate refocusing in real-time or by a post-processing. For this purpose, a 'sweep camera' physically sweeps its focal plane across a scene (axially) during the direct capture, directly recording focal stacks (unlike the light-field camera), hence preserving sensor spatial resolution and saving the computation power/rendering time. Alternative sweeping methods can even contain a dynamic scene captured within a finite time period and, therefore, include the motion within the scene. In a simpler way, captured focal stack can be used to blend in-focus (sharp) patches from individual images following registration and appropriate scaling or, alternatively, for post-refocusing.

While capturing an instant light field may be beneficial in some situations, capture within the duration of time can result in a unique processing/refocusing experience, such as simultaneous perception of the dynamic objects within the scene by a user (e.g., combined with the dynamic focusing). Focal sweep can be implemented in multiple ways. Since scene motion and camera-shake can lead to motion blur in the captured images, it is important to capture the entire focal stack in a short time period, typically by either translating the scene along the optical axis during image exposure, or by sweeping the image sensor relatively to the subject. For a given pixel size, frame rate, and f-number of the lens, the overall capture time and total image count are highly related to focal length and scene distance range.

SUMMARY

The present disclosure includes a method for operating a camera. A lens or a sensor of the camera is rotated about an axis to a plurality of positions, and the rotation generates a rotation of a plane of sharp focus of the camera. At each of the plurality of positions, an image is captured. For each image, a substantially in-focus region is determined. The substantially in-focus regions are combined to generate a composite image.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is an example mobile device for capturing images.

Like reference symbols in the various drawings indicate like elements.

DETAILED DESCRIPTION

Figure 2A:
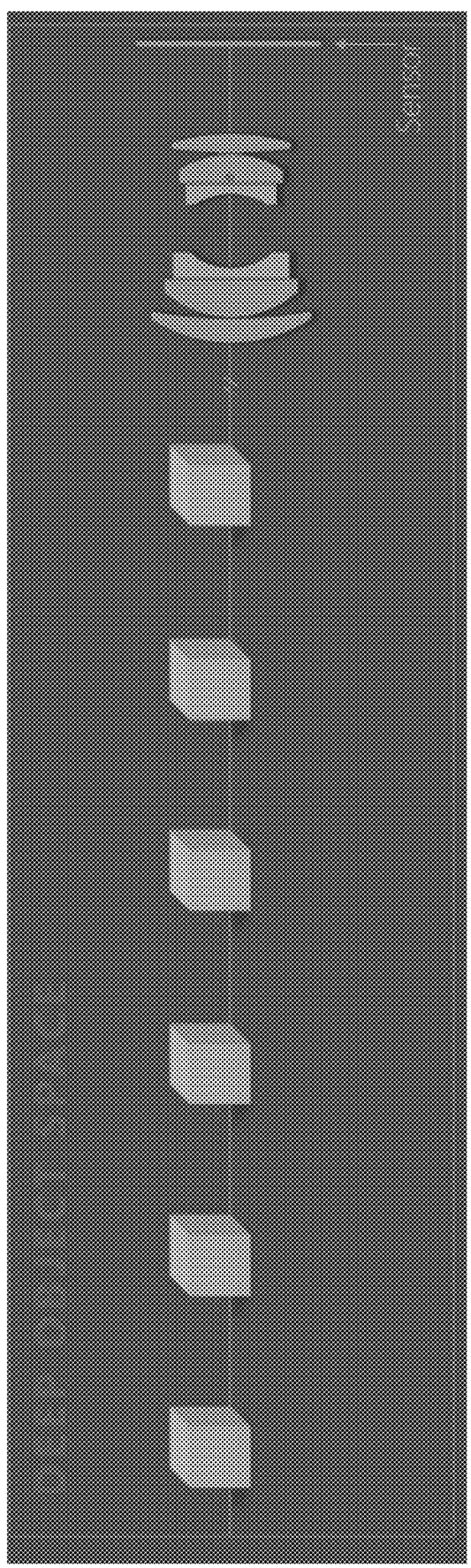
FIGS. 2A-F illustrate rotation of depth of field as the lens rotates.
Figure 2B:
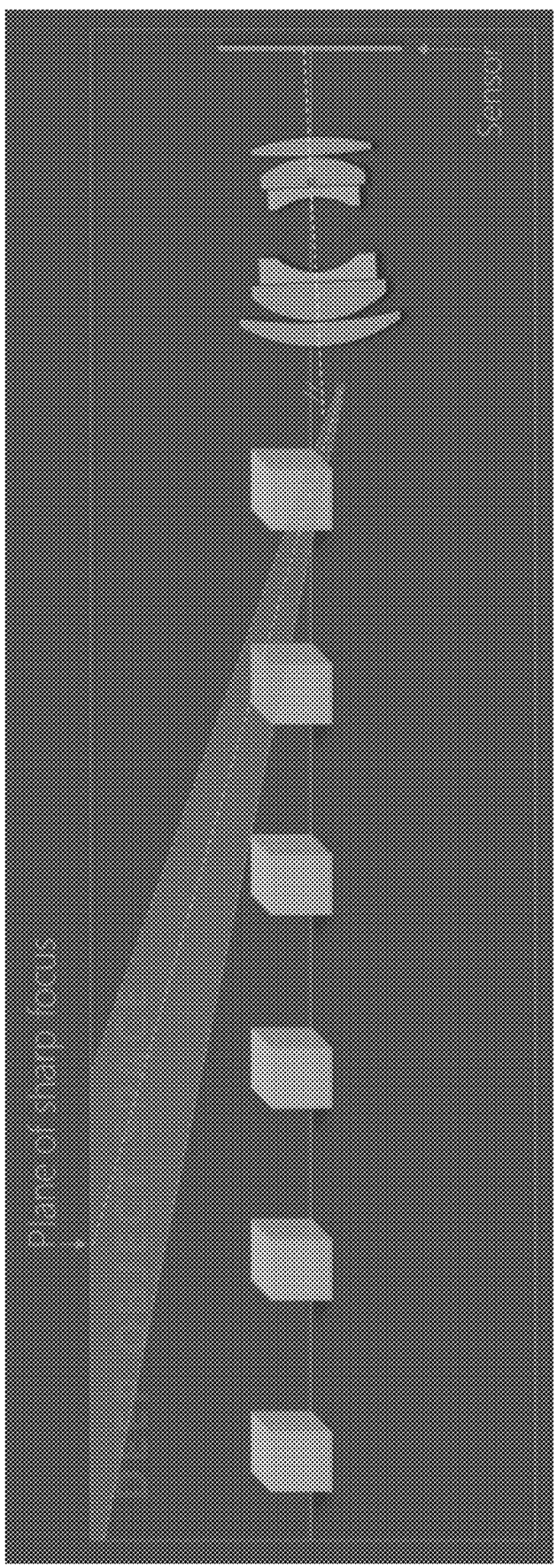
Figure 2C:
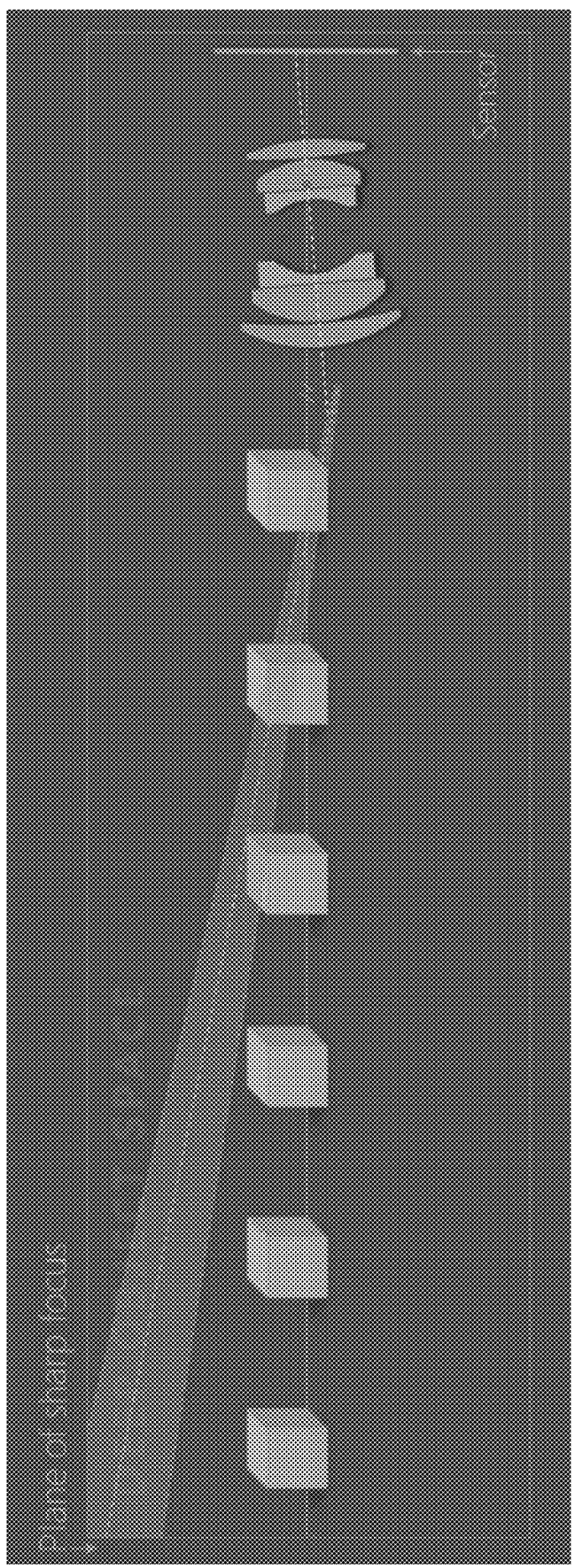
Figure 2D:
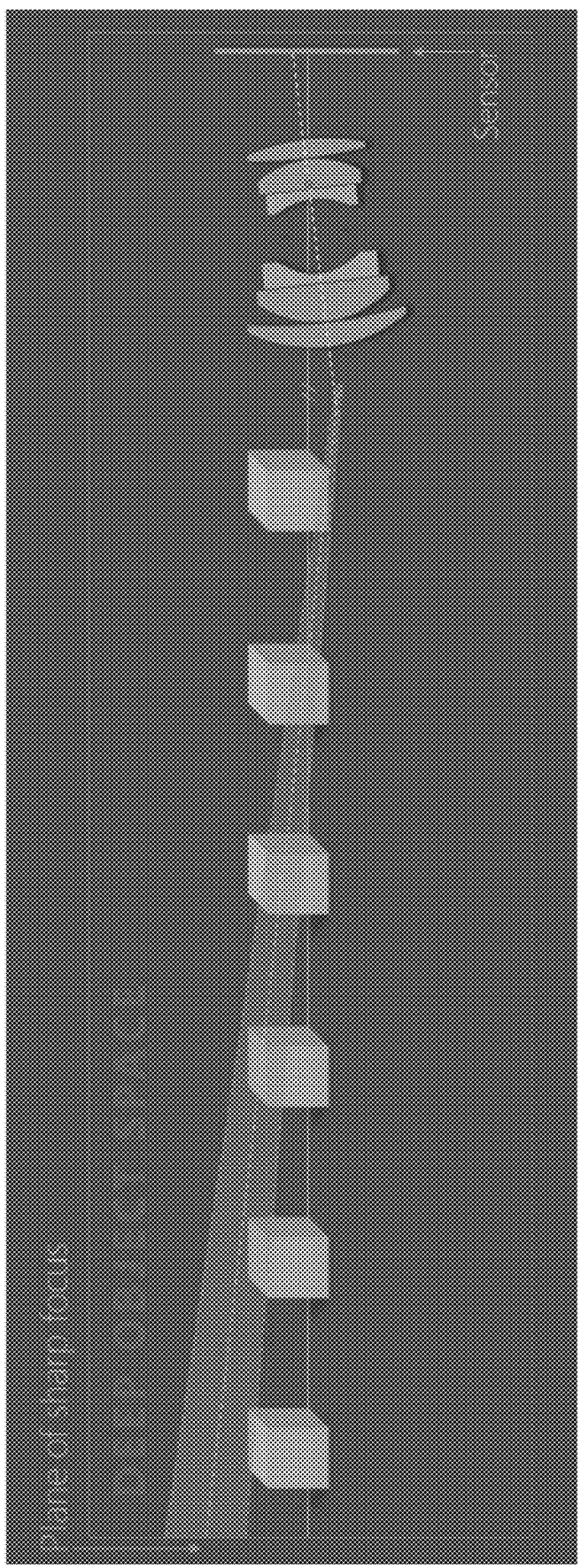
Figure 2E:
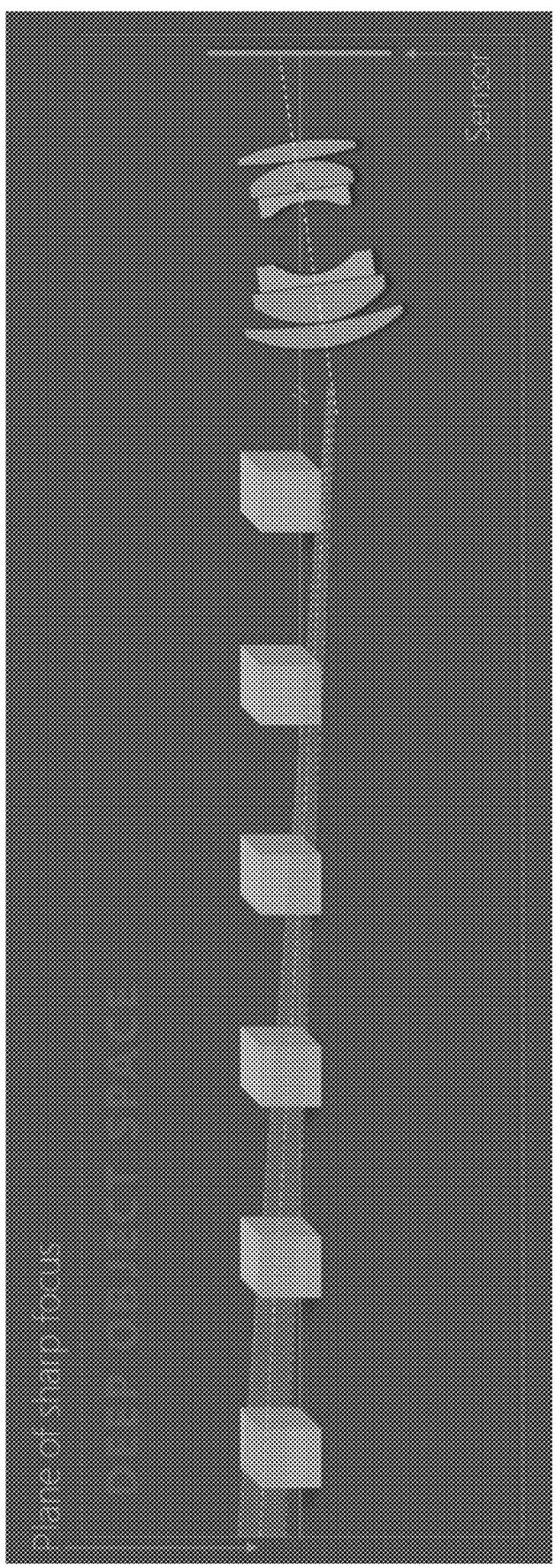
Figure 2F:
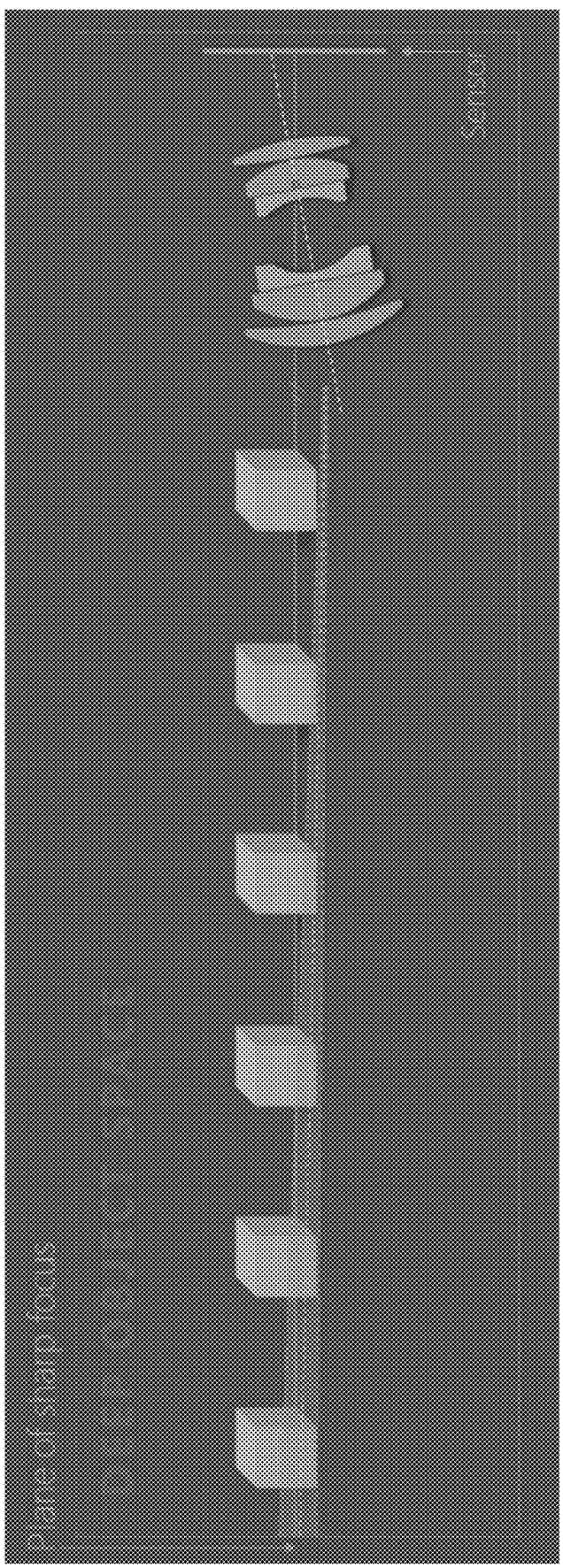

The limited DOF is a fundamental problem (along with spatial resolution and loss of three-dimensional information) that afflicts several imaging applications such as optical microscopy, machine vision, biometric imaging, and others. There are several techniques in imaging that work around the DOF problem such as Scheimpflug imaging and (frontoparallel) focus stacking. The term frontoparallel typically means the typical imaging configuration in which the sensor plane, the lens plane, and the plane of sharp focus are mutually parallel and are perpendicular to the optical axis.

In Scheimpflug imaging, the lens, the sensor, or both are tilted inducing a rotation of the plane of sharp focus. Using appropriate tilts of the lens and/or sensor plane, the plane of sharp focus can be oriented to maximize otherwise increase focus on a tilted object surface or while photographing a scene with significant depth. The DOF region surrounding the plane of sharp focus is still finite.

In focus stacking, images are captured at multiple focus depths either by changing the image- to lens-plane distance or by changing the focal length. Consequently, in a single image, only those regions of the scene that are at the appropriate depth form sharp images. Since the focal depth is continually varied, collectively, the stack contains the whole scene in focus distributed among the images.

The images in the stack may have significantly different magnifications. Therefore, the images may initially be registered with respect to a reference image and then, the in-focus regions may be identified and blended to create an all-in-focus image. Although there are several focus measure algorithms to determine the in-focus regions within an image, a Laplacian of Gaussian (LoG) filter may be applied to most situations.

The present disclosure combines techniques from both the Scheimpflug imaging and focus stacking. In these instances, multiple images may be captured while rotating the lens or image sensor about an axis such as the entrance pupil. During the rotations, the plane of sharp focus and the wedge-shaped depth of field region sweep through the scene forming regions in sharp focus across the images in the stack. These in-focus regions can be selectively blended following registration and identification of in-focus regions. Unlike in the case of frontoparallel focus stacking, the extents of the DOF region in each image is generally within the field of view of the camera (especially for larger tilts of the plane of sharp focus).

FIG. 1 illustrates an example mobile device 100 including a camera 102 for capturing images. In particular, the camera 102 rotates either a lens or an image sensor about an axis to multiple positions and captures images at each of the positions. The rotation may be about the center of the entrance pupil of the lens. If lens rotation is employed, then it is advantageous to rotate the lens about the center of the entrance pupil as this allows the use of analytic registration algorithms that are efficient and exact. If the lens is not rotated about the entrance pupil, then an automatic, elastic registration algorithm may be used. In some instances, the rotation may be between two angles such as −10° to +10°. Other angles may be used without departing from the scope of the disclosure such as −15° to +15°, −5° to +5°, or others. Also, the angular range does not need to be symmetric about zero. For example, in the real experiment, we use 7 angles between −16 and −19 degrees. During the rotation, the camera 102 captures at least two images. For example, the camera 102 may capture 10 images, 15 images, 50 images, or other number of images. The number of images may be a function of the desired image quality and/or the volume of the object space. For each image, the mobile device 100 determines the substantially in-focus regions and combines the substantially in-focus regions to form the composite image. The composite image can include a three-dimensional map of a scene.

While the mobile device 100 is illustrated as a cellular phone, the camera 102 may including at least one of a rotating lens or sensor to be integrated into other devices without departing from the scope of the disclosure such as a camera, a laptop computer, a tablet computer, a monitor, a personal digital assistant, or other devices. The device can include one or more processors, and a non-transitory computer-readable medium coupled to the one or more processors and storing programming instructions for execution by the one or more processors. Thus, the sweep focal stack capture may be implemented either with non-miniature lens systems or with miniature camera modules. In miniature camera modules, the camera 102 may have moving lenses as well as phase detection to assist in autofocus (AT). In some instances, these types of lenses are relatively wide, and the aperture is very small. Such lenses do very little focusing since the distance of moving the lens into focus is very miniscule. In general, the amount of motion in order to focus a lens is far less than the amount used for zooming. Thus, rotating a lens or sensor for miniature camera modules may be implemented using, for example, microelectromechanical systems (MEMS) or other systems without departing from the scope of the disclosure. In regards to non-miniature lens systems, the camera 102 may rotate the lens or the image sensor using, for example, motors such as AFD Motors, Micromotor, USM (ring ultrasonic motors and the micro ultrasonic) motors, or other motors or systems without departing from the scope of the disclosure.

In some instances, the camera 102 may use a small focal length lens, since rotating a sensor by certain distances at frequencies above a few Hz may be limited by the actuator performance and induced sensor vibration (image quality deterioration). In some instances, the camera 102 may also provide near infinite depth-of-field with fewer images captured, which may result in simpler image reconstruction procedures.

FIGS. 2A-2F illustrate a system 200 where a lens 202 is rotated to generate a rotation in the plane of sharp focus 204. We capture multiple images while rotating the lens about the entrance pupil. The plane of sharp focus and the wedge-shaped depth of field region sweeps through the entire scene forming regions in sharp focus across the images in the stack. These in-focus regions can be selectively blended following registration and identification of in-focus regions. Each of the substantially in-focus regions can be within a depth of field of an exactly in-focus region. Unlike in the case of frontoparallel focus stacking, the extents of the DOF region in each image is generally within the field of view of the camera (especially for larger tilts of the plane of sharp focus).

Figure 3:
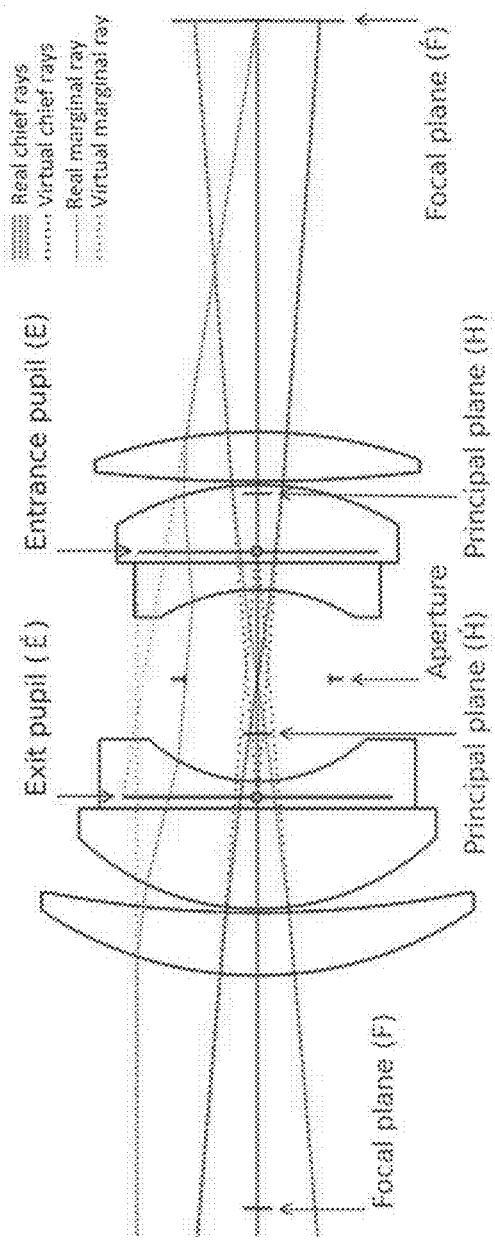
FIG. 3 illustrates an example lens.

FIG. 3 illustrates an example lens 300 including an entrance pupil 302 and an exit pupil 304. The entrance pupil 302 is the image of the stop (limiting aperture) seen through the lens elements preceding it is. The exit pupil 304 is the image of the stop seen through the elements following it is. Furthermore, the entrance pupil 302 is the center of projection in the object side since chief-rays originating from the object converge (virtually) at the center of the (unaberrated) entrance pupil 302. On the image side, the chief-rays emerge (virtually) from the center of the exit pupil 304. Therefore, the entrance pupil 302 and the exit pupil 304 are the centers of projection on the object and image side respectively.

The ratio of the (paraxial) exit pupil size to the entrance pupil size is defined as the pupil magnification, m_p, (we will revisit this in the model). Further, when we rotate a lens (say about the entrance pupil), the position of the exit pupil translates, causing the bundle of chief rays emerging from the exit pupil towards the image plane to shift. Consequently, the image field (of a scene) on the sensor plane translates (in the x-y plane of the sensor) in response to the rotation of the lens. The exact nature of translation (and associated geometric distortion) of the image field depends on the value of the pupil magnification and the point of rotation of the lens along the optical axis.

Figure 7:
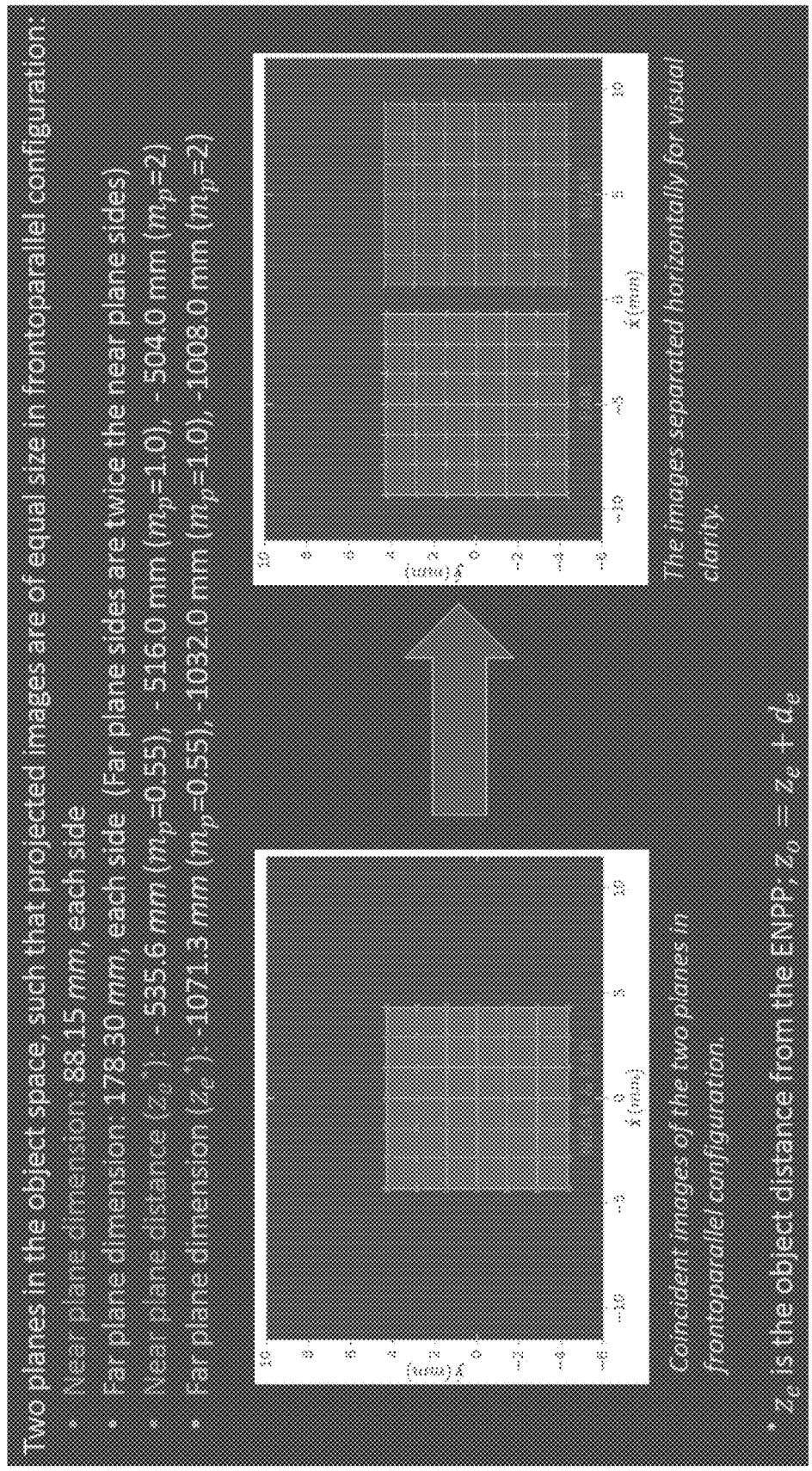
FIGS. 7-11 illustrate the disclosed method when pupil magnification is not equal to one and/or the lens is rotated about a point different from the entrance pupil.
Figure 8:
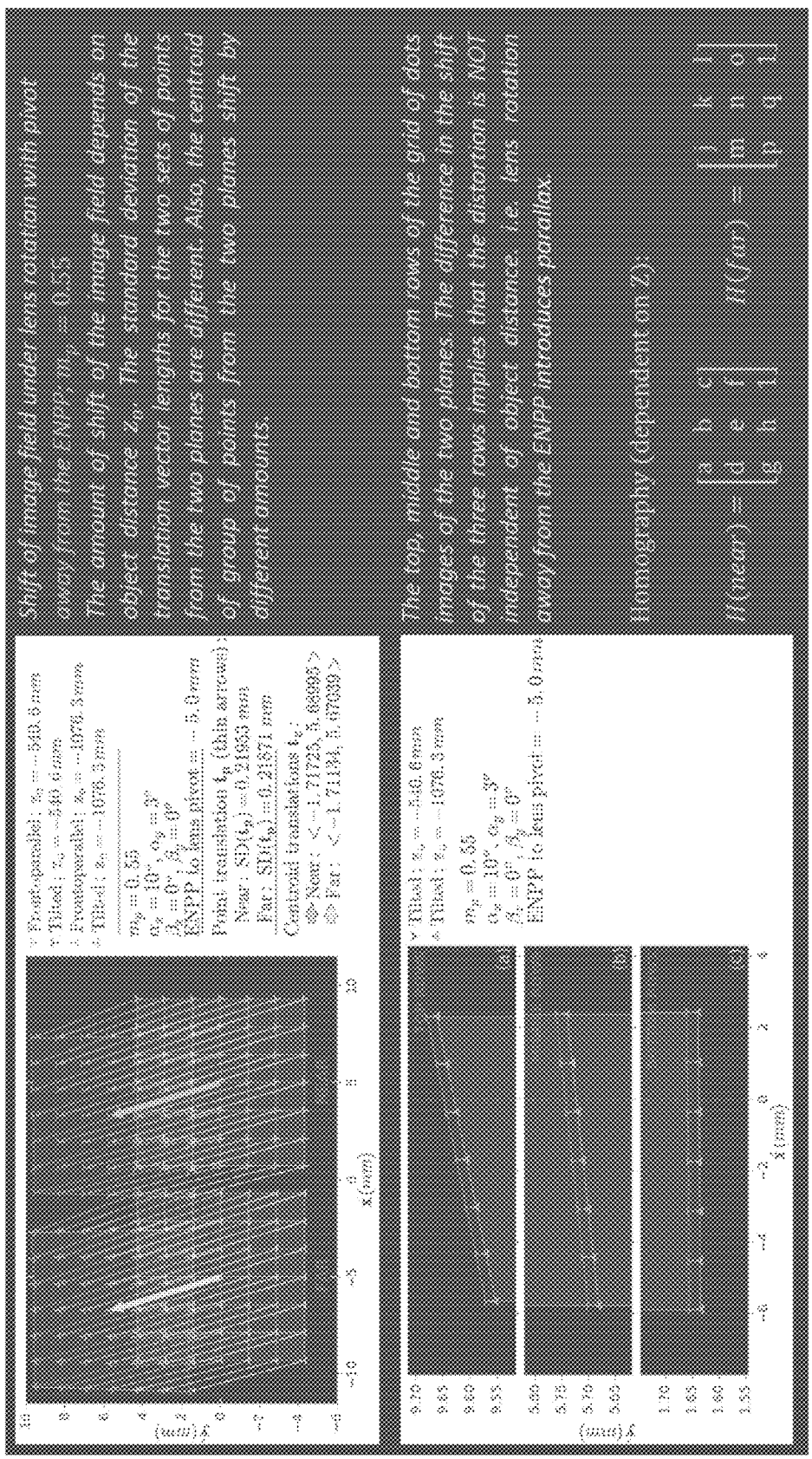

Ignoring the addition and subtraction portions of the image field near the edges, the shift of the corresponding points between two images obtained under two different rotations of the lens can (usually) be described by a transformation called the inter-image homography (see FIG. 7 and FIG. 8 for examples of the type of shift of the image field expected under lens tilts). If the inter-image homography is known, we can undo the shifts (and distortion) of the image obtained under lens rotations during the process of registration. If this transformation is not known, we would have to estimate it from the observed images (for example, using the OpenCV function findHomography( )). Such methods work well if the images are not blurry. However, since tilting the lens results in a significant portion of the object space to become out of focus in each individual image, the estimated homography from the images are expected to have large errors. Therefore. (for our particular problem) it is highly imperative to have prior knowledge about the inter-image homography.

As it turns out (see the "math" for details) if the lens is rotated about the entrance pupil, an inter-image homography that is independent of object depth exists. Instead, if the lens is rotated about a point other than the center of the entrance pupil, the amount of shift experienced by points in the image also depends on the object distance of the corresponding point. This is a consequence of the fact that the entrance pupil translates if the lens is rotated about any a different point.

Furthermore, if the lens has pupil magnification ($m_p$) equal to one, and it is rotated about the center of the entrance pupil, the inter-image homography is a very simple matrix—a special case of similarity transformation consisting of only translation and uniform scaling components.

Figure 4:
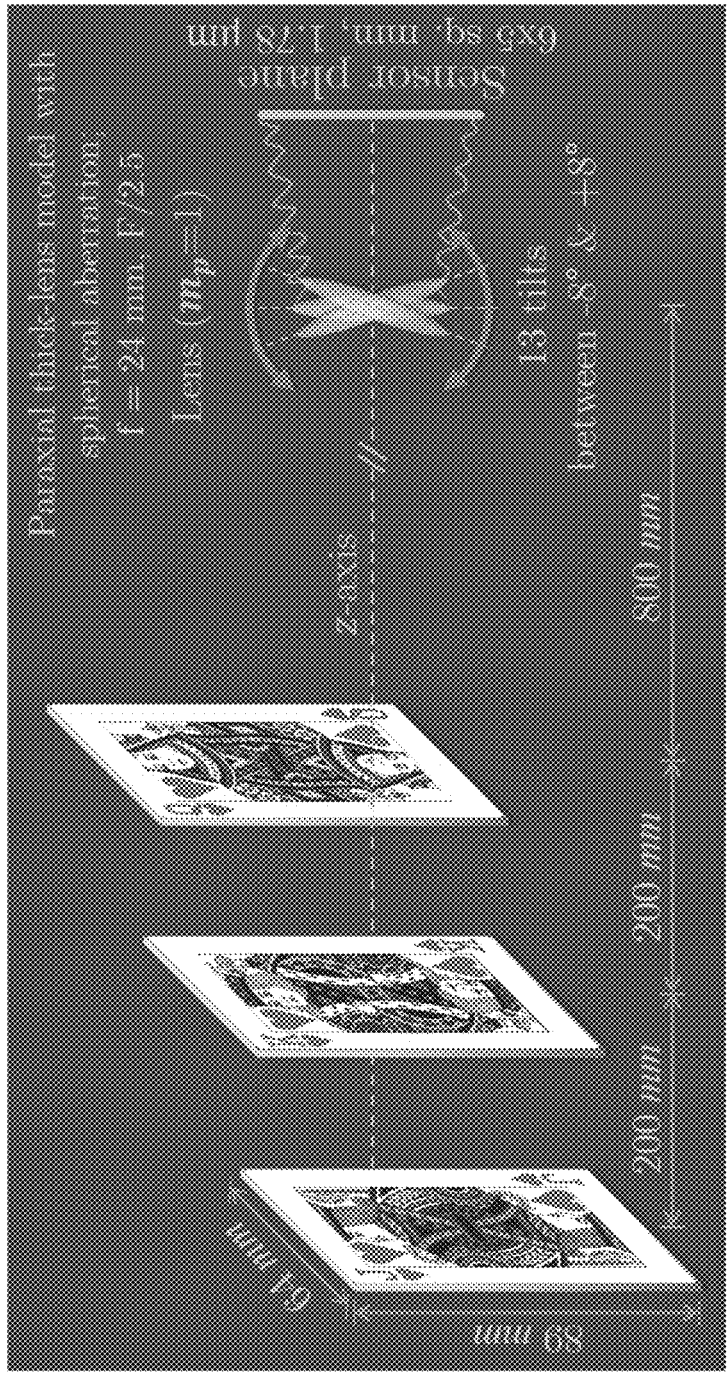
FIGS. 4-6 illustrate an example simulation for the disclosed method.
Figure 5:
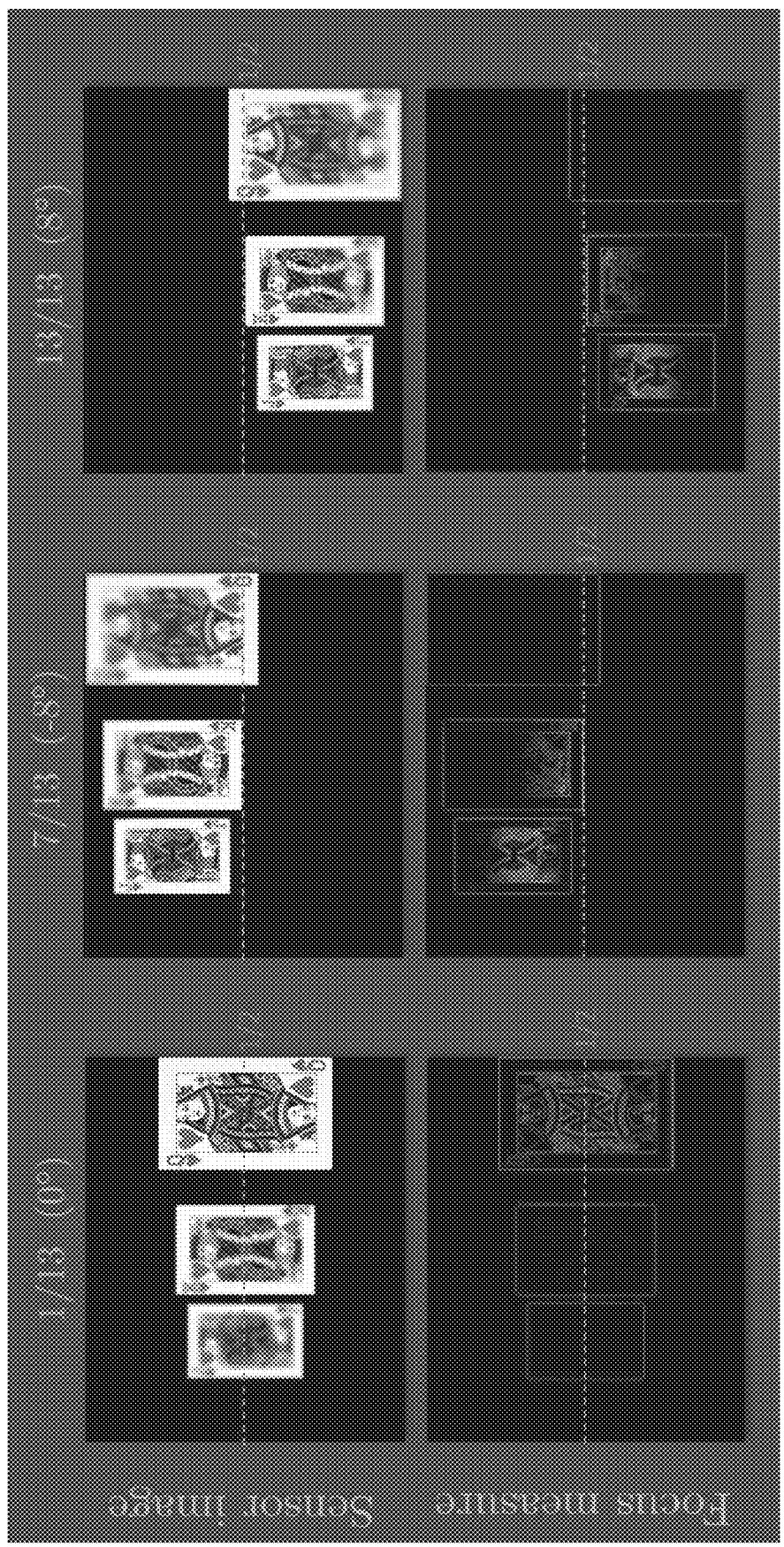

FIGS. 4 and 5 illustrate a Zemax based simulation platform we used to verify the above theory. As shown in FIG. 4, a 24 mm, f/2.5 paraxial thick lens with pupil magnification=1 (symmetric lens) images three playing cards placed at 800 mm, 1000 mm, and 1200 mm from the lens' vertex. A slight amount of spherical aberration is introduced to ensure that the focused PSF size was comparable to the pixel size of the (simulated) digital sensor. A Python Zemax Dynamic Data Exchange (PyZDDE) library is used to automate and control the simulation. The main task of PyZDDE was to automatically tilt the lens (the two paraxial surfaces, the pupil surfaces, and the aperture mainly) by the specified tilt angle, initiate the image simulation tool in Zemax with the specified parameters, and return the simulated image once Zemax finished the image simulation. Python was used to store the images tagged along with the simulation parameters into an HDF5 file (using h5py library).

For the simulation, 13 images were captured (simulated) while rotating the lens about the entrance pupil between −8° and +8°. Since the pupil magnification equals one, a simple shift (along with uniform scaling) was expected of the image field.

The three sensor images from FIG. 4 are shown in FIG. 5 for side-by-side comparison. A shift of the image field occurs between the images and the different regions of the three cards that are in focus. When the lens is tilted, no card—all of which are frontoparallel to the image sensor—is completely in focus; but small portions of all cards (especially the middle and rear in this simulation) can be seen in focus as is typical in Scheimpflug imaging.

Figure 6:
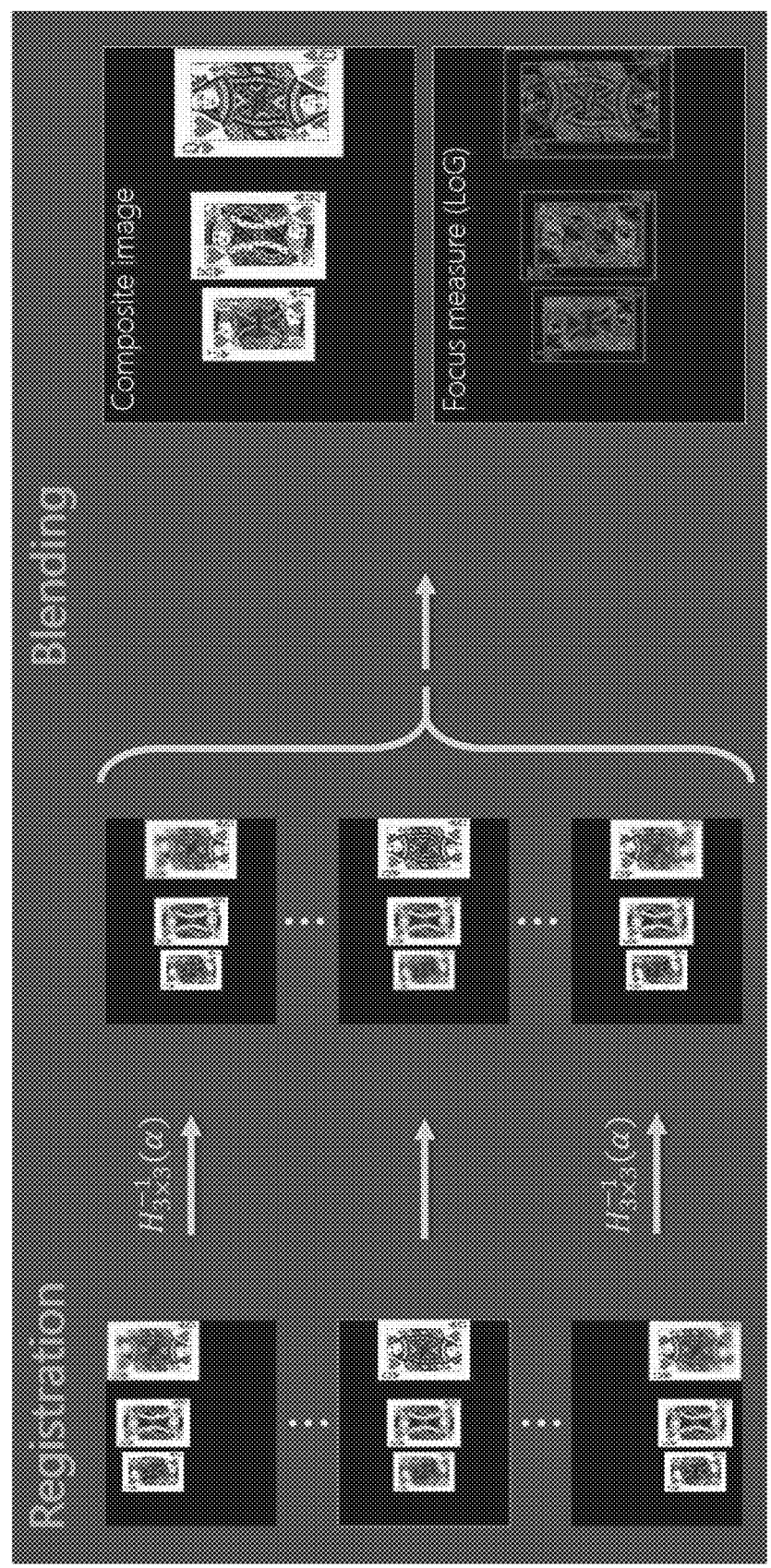

Following the creation of the stack, we register all the images by undoing the shift and scaling using the closed form inter-image homography (FIG. 6). Then, the in-focus regions in each image is detected using a Laplacian of Gaussian (LoG) filter, and these regions are blended to form a composite image. Observing the composite image and its focus measure in FIG. 6 we see that all three cards are in focus. In comparison to frontoparallel focus stacking, the disclosed implementations may include one or more of the following advantages: (1) the registration (image alignment) using closed form equation is simple, especially if the pupil magnification of the lens is one; and (2) our method can be used to improve the depth of field around a tilted object plane in Scheimpflug imaging (more on this later).

The disclosed process can also be used when the pupil magnification ($m_p$) is not equal to one and as well as when rotation is about a point away from the entrance pupil. The rotation of the lens induces a shift and scaling of the image field. If the pupil magnification ($m_p$=1) equals one, the scaling is isotropic, and the shift is simple (the entire image fields translates uniformly along a particular direction in the sensor plane). If the pupil magnification is not equal to one, then anisotropic shift across the image field manifests as image distortion. However, irrespective of the value of the pupil magnification, if the lens is rotated about the entrance pupil, then the inter-image homography (the transformation that relates corresponding points between two images obtained under two tilts of the lens) is independent of object distance.

The following figures illustrate the above concept. FIG. 7 shows the setup for the ensuing qualitative analysis. The two overlapping grids on the left in FIG. 7 are the coincident images of two planes in the object spaces—a near plane, a square of 88.15 mm on each side, and a far plane, a square of 178.3 mm on each side placed at twice the distance of the near plane from the entrance pupil. The exact distances vary depending upon the pupil magnification, such that the images of the two planes are 4.5 mm on each side on the sensor. The z-axis of the camera frame passes through the center of both object planes. Therefore, the images of the two square grids are coincident in the frontoparallel configuration. The "image points" are the points of intersection of the chief-rays emanating from a 7×7 square object grid with the image plane. The lighter shaded orange "Y" markers represent the group of image points from the near object plane in frontoparallel configuration. The lighter shaded blue "inverted Y" markers represent the image points from the far object plane in the frontoparallel configuration. In frontoparallel configuration, the two images of the two object planes coincide; however, for the sake of visual clarity, we displaced the two set of image points horizontally by 5 mm on either side of the center (shown on the right side of FIG. 7).

The darker shaded markers of either color (in FIGS. 8-11) represent the image points following the rotation of the lens. The translations of the image points are shown by the gray arrows between the original and shifted positions. The gray level of the arrows specifies the normalized magnitude of translation—brighter indicates relatively larger translation. The figures also display information about the standard deviation (SD) of the arrow lengths. This statistic gives a sense of the non-uniform translation of the image points across the image field. If all image points shift by the same amount, then the standard deviation will be zero. A larger value of the standard deviation indicates greater diversity in shifts, and hence greater distortion. In addition to the standard deviation, we also measure the amount by which the centroid of the set of points from the two images shifts. The translation of the centroid gives a measure of the global image field shifts.

Figure 9:
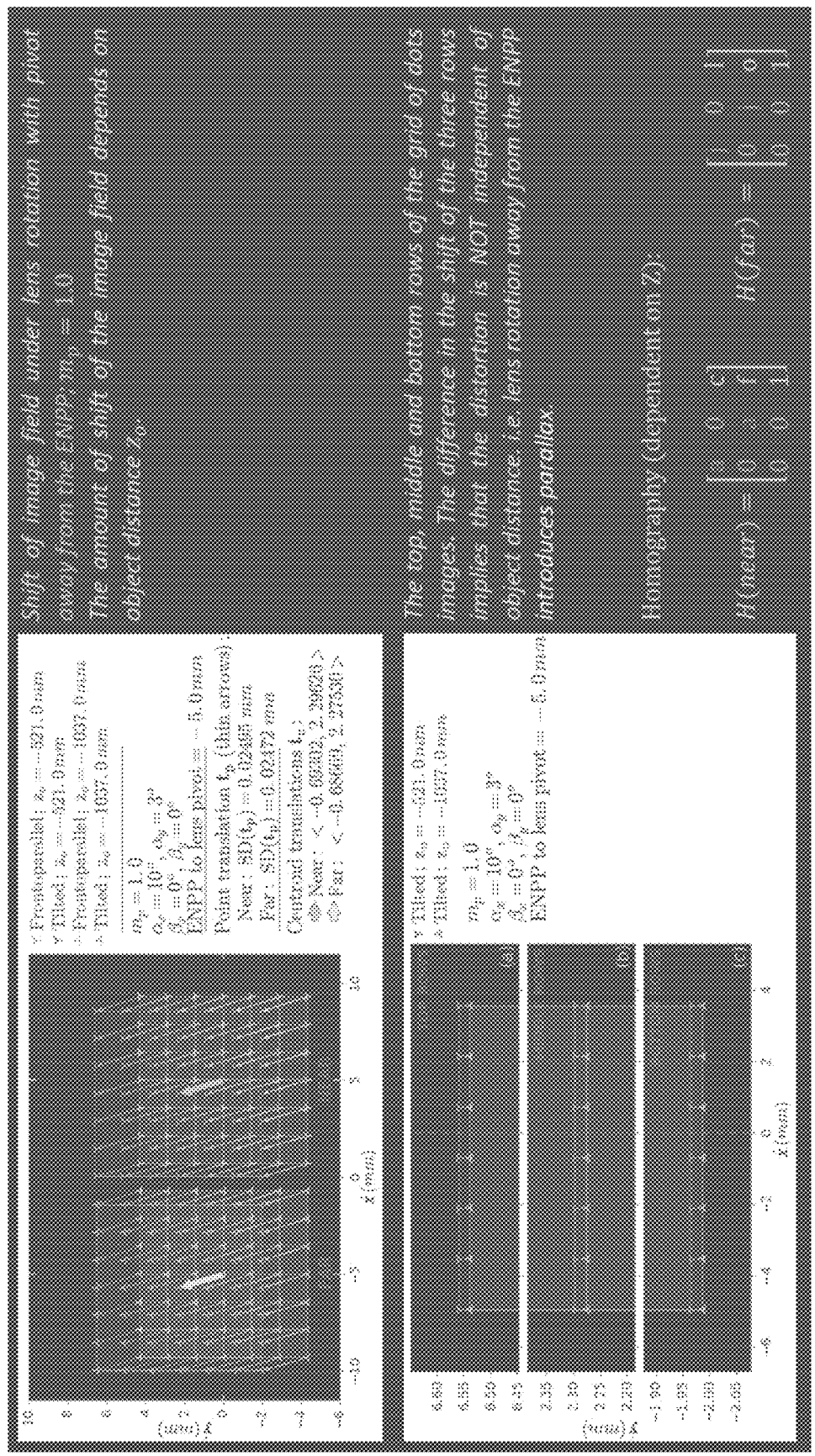
Figure 10:
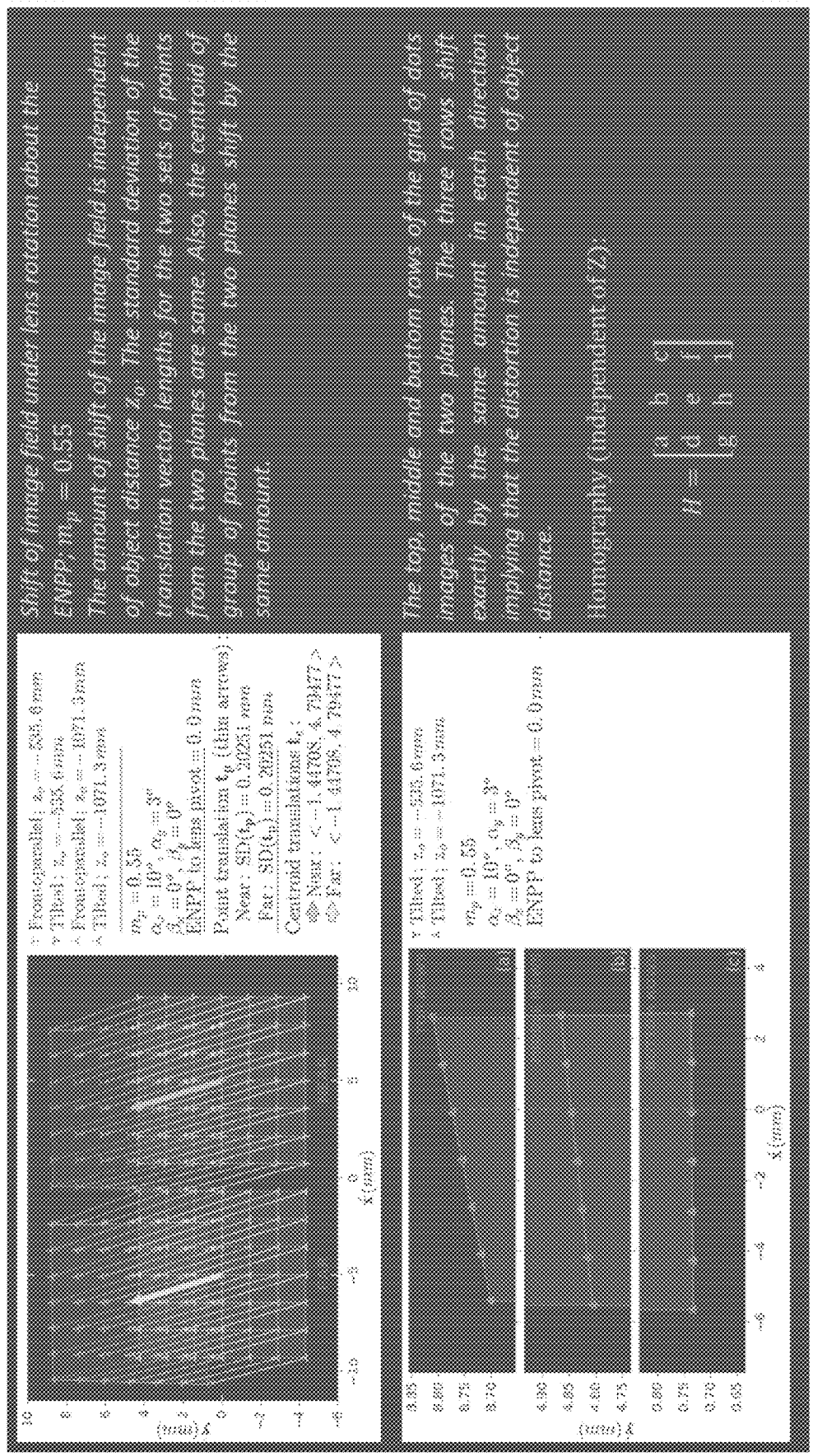
Figure 11:
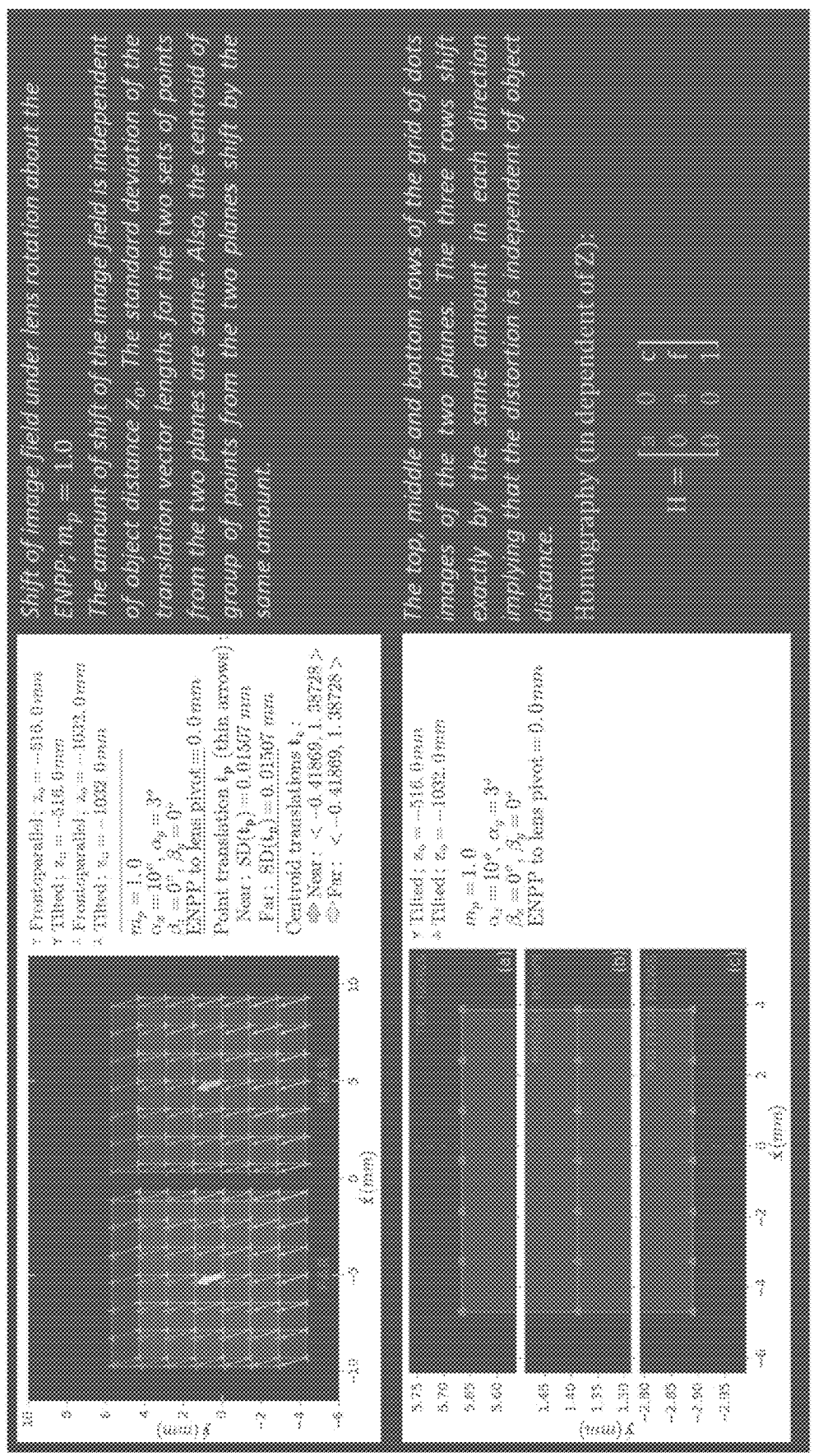

FIGS. 8-9 show the movement of the grid of image points when the lens is rotated about a point away from the entrance pupil. Notice the parallax effect as a consequence of the rotation of the lens away from the entrance pupil. When a lens is rotated about the entrance pupil there is no parallax as shown in FIGS. 10-11. Equivalently, the inter-image homography is independent of object distance.

Figure 12:
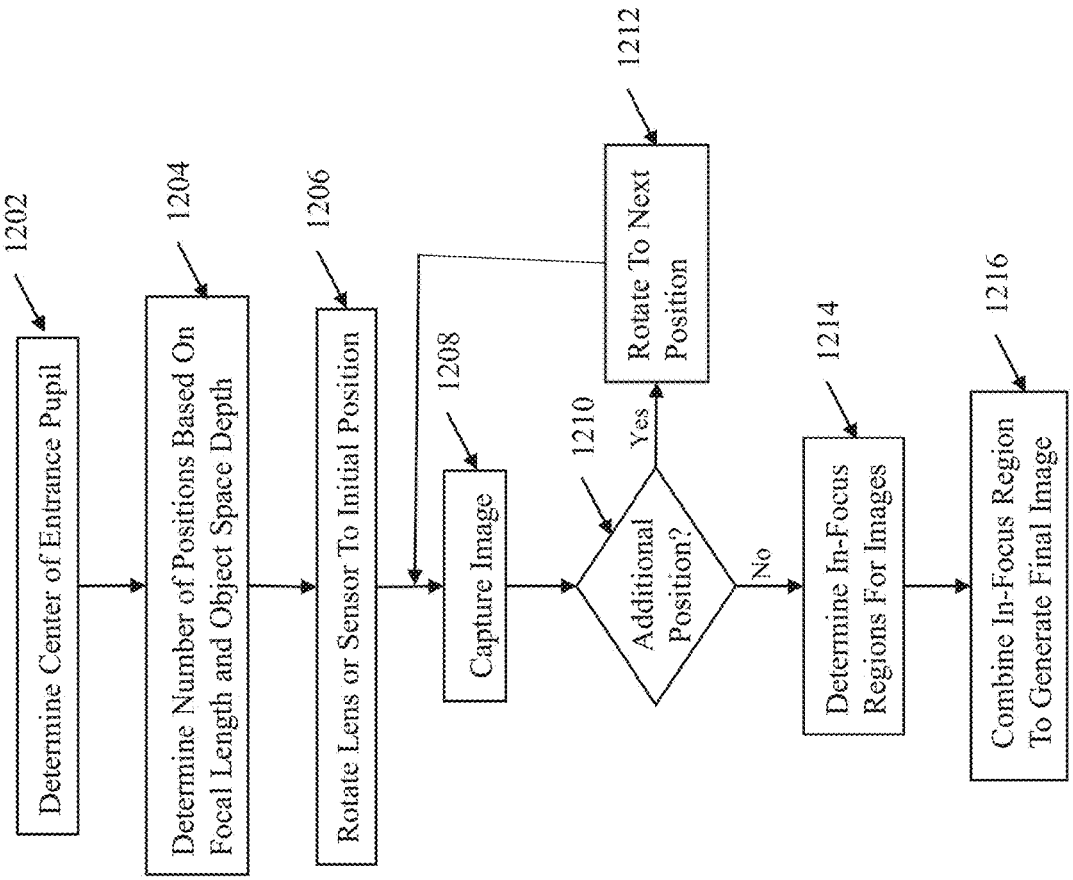
FIG. 12 is a flowchart illustrating an example method for combining in-focus regions of images.

FIG. 12 is a flowchart illustrating an example method 1200 for combining in-focused regions to generate a composite image. Method 1200 begins at step 1202 where the center of the entrance pupil of a lens is determined. Next, at step 1204, the number positions and rotation angle are determined based on the focal length and object depth. At step 1206, the lens or sensor is rotated to an initial position, and, at step 1208, an image is captured. If lens or sensor is designed to rotated to an additional position at decisional step 1210, the lens or sensor is rotated to the next position at step 1212. At step 1208, an image is captured. If the rotation has no an additional position at decisional step 1210, then, at step 1214, the in-focus regions for each image are determined. Next, at step 1216, the in-focus regions are combined to determine a composite image.

Figure 13:
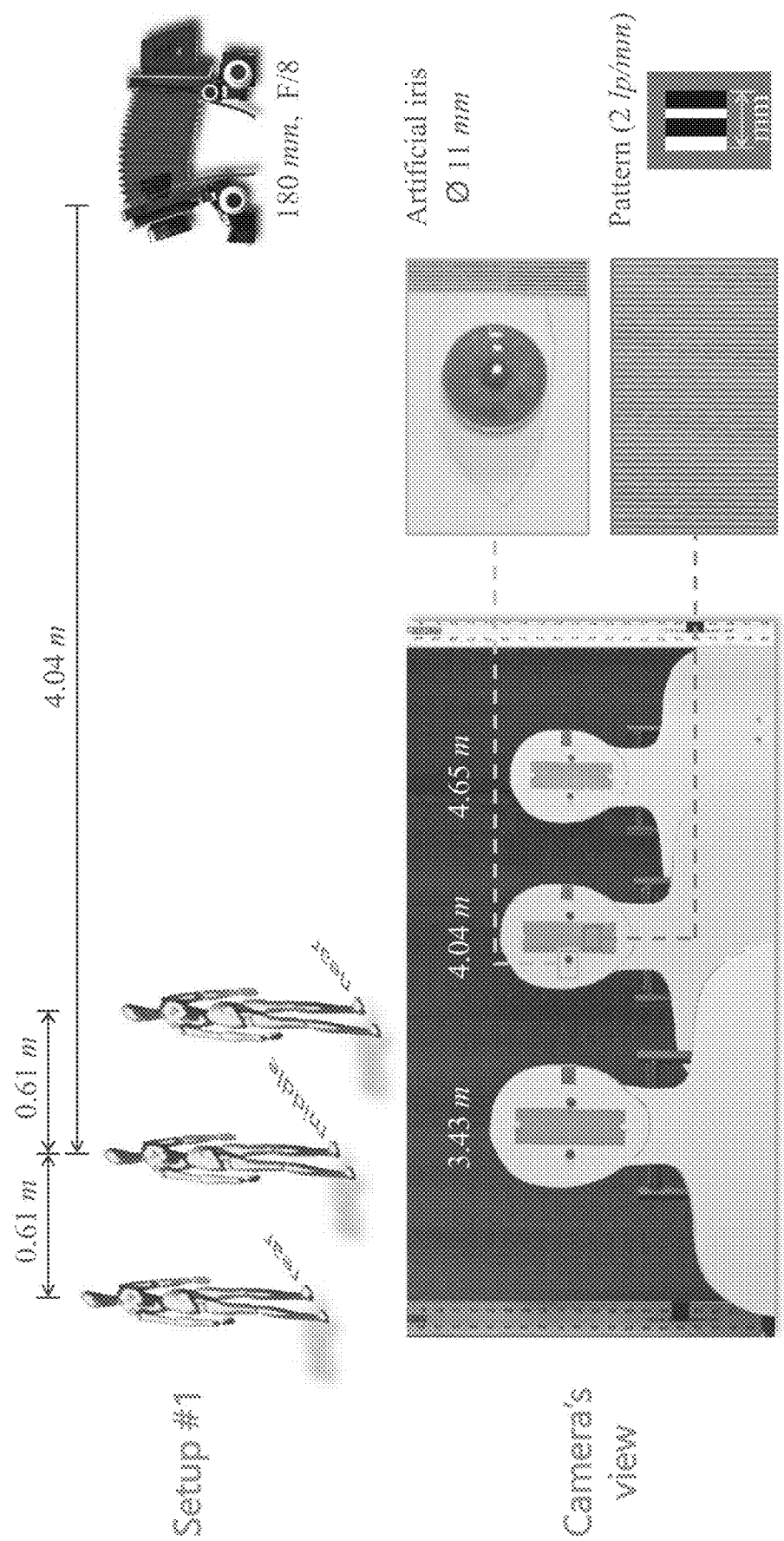
FIGS. 13-20 illustrate example experimental results.

FIGS. 13-20 illustrate experimental results. Now we demonstrate the capability of Angular Focus Stacking (AFS) to extend the axial capture volume (depth of field) for iris recognition. We use a Sinar P3 view camera fitted with a 180 mm focal length, F/5.6-F/64, Rodenstock lens and a 50 megapixel, 86H evolution series digital back. The setup is shown in FIG. 13. We performed these experiments with an aperture setting of F/8 since it provided an optimal balance between the optical resolution and the instantaneous DOF (which dictates the total number of images required for focus stacking). Setup for demonstrating capture volume extension. We placed three human figure cutouts at 3.429 m, 4.038 m and 4.648 m, measured from the center of the entrance pupil of the lens. Each cutout consists of a 2 lp/mm resolution target and a pair of artificial iris of diameter equal to 11 mm. We also placed two long aluminum rulers on each side to aid image registration.

The goals of this demonstration are:
1. To show a substantial improvement in capture volume using AFS.
2. To show that the total time required for capturing all images in the focal stack is less than the exposure time of a single-shot image with equivalent DOF and exposure level.

Figure 14:
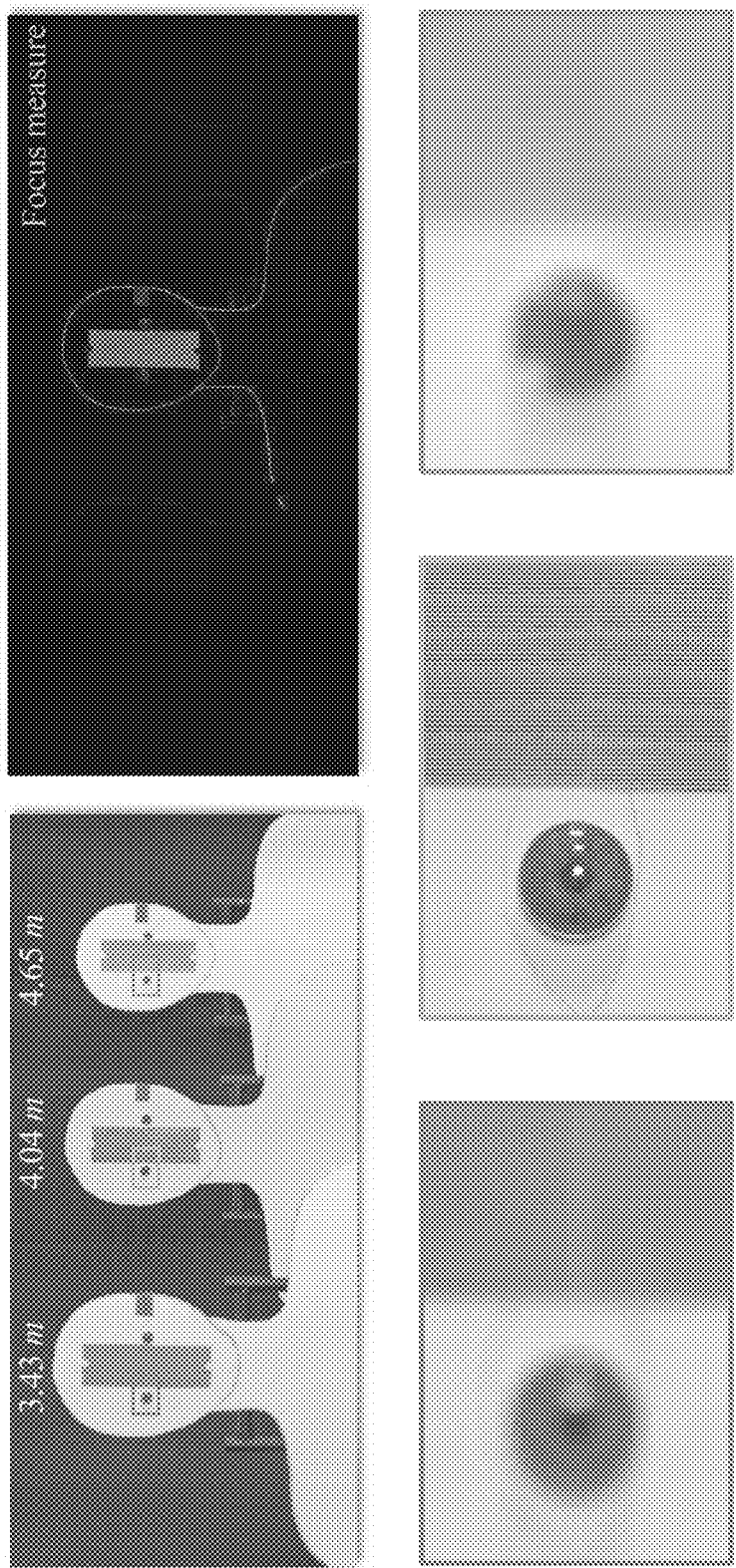

FIG. 14 is an image captured with an aperture value of F/8 in frontoparallel (conventional) configuration. We focused the camera on the middle cutout. Therefore, the 2 lp/mm resolution target on the middle cutout is perfectly resolved in the image plane. However, the targets belonging to the far and near cutouts cannot be resolved as they lie outside the DOF region.

The equation for geometric depth of field or the diffraction based depth of focus in the image space requires us to define a circular of confusion or a wavelength respectively. However, here we are interested in a definition of depth of field based on a specified object resolution (2 lp/mm). To derive an expression for the DOF (for frontoparallel imaging) as a function of specified object resolution $r_o$ lp/mm, we first find an equivalent $\lambda_{equ}$ such that $$r_o/m_t = \frac{1}{1.22\lambda_{equ}F/\#},$$

the Rayleigh resolution criterion in the image. Then, we substitute $\lambda_{equ}$ in the common geometric depth of focus equation to get an expression for the depth of focus. Further, we can obtain the boundaries of the DOF in the object space by applying the Gaussian lens equation to the half depth of focus on either side of the focal plane in the image space. The final expression for the DOF as a function of the specified resolution in the object space is shown below:

$$DOF(r_o) = \frac{10.5\pi F/\# f^2 r_o}{m_t(\pi r_o f - 5.25F/\#)(\pi r_o f + 5.25F/\#)} \quad (0.1)$$

where, F/# is the effective F-number, $m_t$ is the transverse magnification, f is the focal length and $r_o$ is the specified resolution in the object space in lp/nm. Based on measurements, we have observed that Eq. (0.1) is accurate in predicting the DOF.

Using Eq. (0.1), and confirmed by observation, we found the DOF for $r_o$=2 lp/mm at 4.038 m to be approximately 29 cm.

In the first experiment, we captured seven images for AFS in increments of −0.5° between α=−16° and −19°. The bounding angles were determined such that the plane of sharp focus for the maximum lens tilt, α=−19°, passes through the eye level of the rear cutout at an angle of about 6.50 with the horizon, and for the minimum tilt angle, α=−16°, it passes just above the eye level of the front cutout (see FIG. 15). The value of $\dot{z}_o$, must be such that when α=0° (frontoparallel configuration), the plane of sharp focus, perpendicular to the optical axis, must lie in front of the first cutout towards the camera. Finding the exact values of α and $\dot{z}_o$ is usually an iterative that may be subjected to an optimization algorithm. All images in the focal stack was captured with an open aperture setting of F/8 and exposure time of 1/1.3 seconds. In-focus regions in the registered images in the focal stack. The in-focus regions, detected by a LoG filter, are overlaid on the corresponding image in the focal stack. The images were captured with lens tilts: (a) α=−160, (b) α=−16.5°, (c) α=−17°, (d) α=−17.5°, (e) α=−18°, (f) α=−18.50, and (g) α=−190. Notice how the DOF zone appear to progressively scan the image from top to bottom with increasing lens tilt angle. Also, observe the failure of the current focus measure filter to detect focus in textureless regions.

Figure 15:
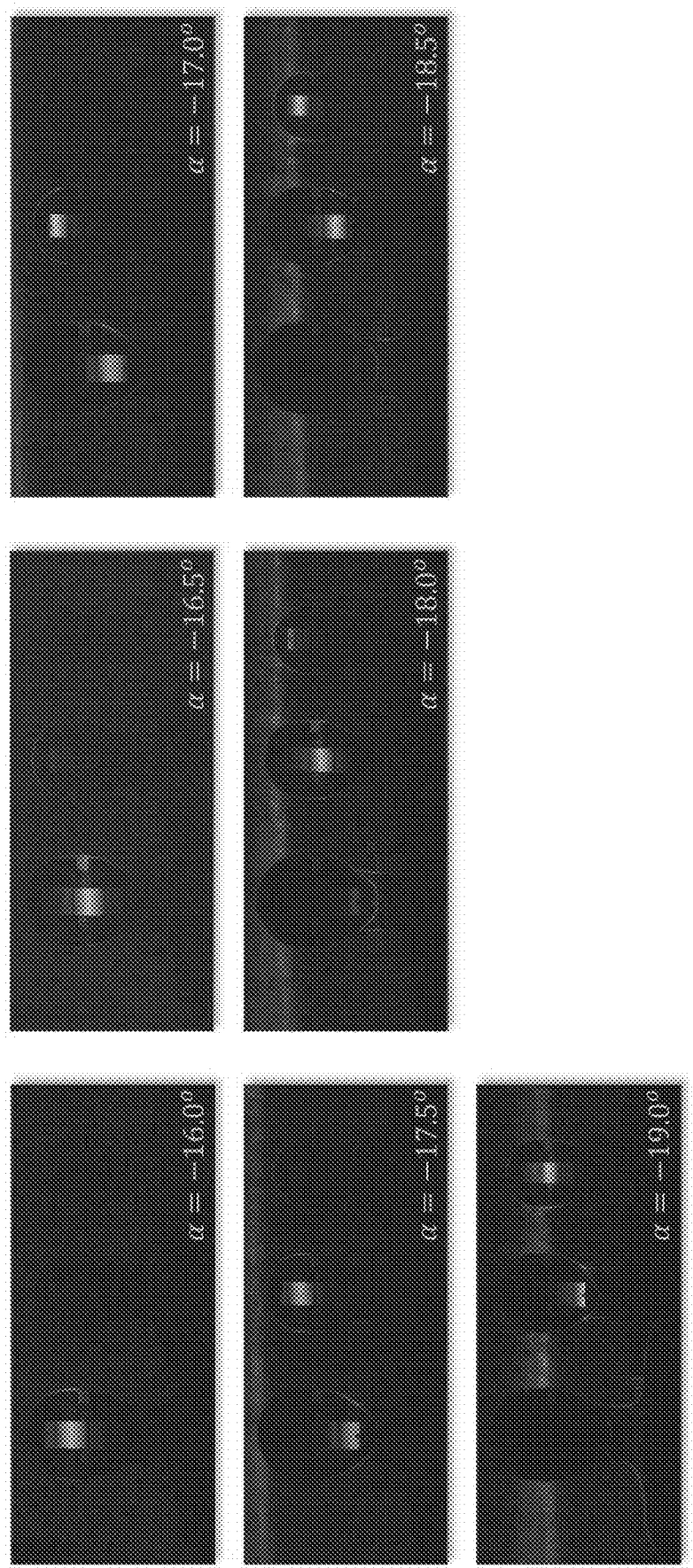

FIG. 15 shows the focused regions in the images in the focal stack following registration. From the analytically obtained homography, we observed that the change of transverse magnification between the images in the stack was infinitesimal as expected (using the inter-image homography equation).

Figure 16:
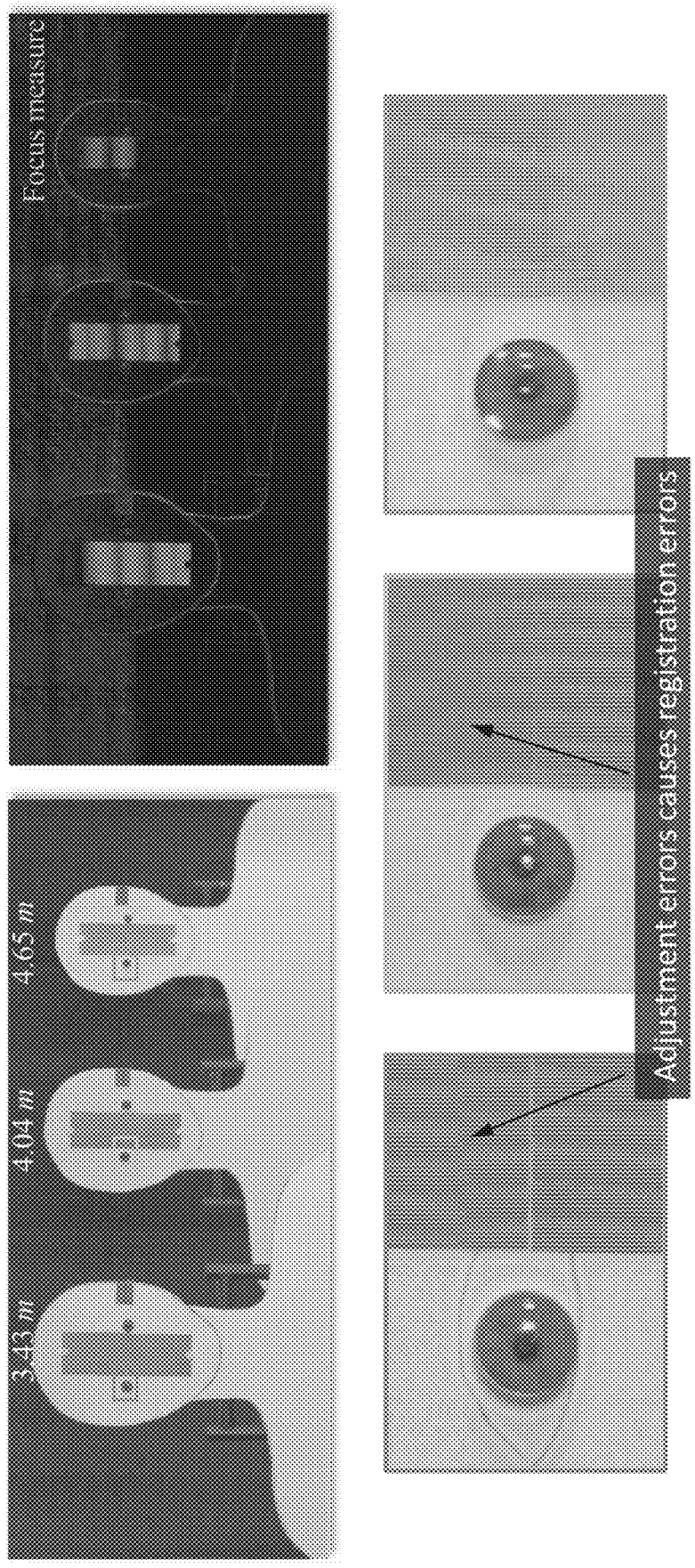

The composite image obtained (using the process described previously) is shown in FIG. 16 and the corresponding focus measure is shown in FIG. 16. FIG. 16 also shows the zoomed-in portions of regions-of-interest, surrounding the eyes in each cutout, from the composite image. It is evident that the high frequency information from all three cutouts are preserved in the composite image. Thus, in this example, we have demonstrated an improvement in the capture volume from 29 cm to at least over 1.22 m-a four-fold improvement in the capture volume.

Furthermore, the total exposure time required to capture all seven images in the stack was 5.4 seconds (1/1.3 seconds for each image). A single-shot image capture with equivalent DOF required using an aperture value of F/22. To capture the image at F/22 while maintaining the same exposure level as that of the composite image, the exposure time required was found to be 8 seconds. Therefore, we can see that the total exposure time required for capturing all images in the focal stack is less than the exposure time required by single-shot image capture for the same DOF and exposure level.

To further improve the factor of DOF extension over conventional single-image capture, we moved the set of cutouts (with the separation in-between them intact) towards the camera by 0.61 m, such that the new distances to the near, middle and rear cutouts from the entrance pupil center of the lens was 2.82 m. 3.43 m, and 4.04 m respectively. Furthermore, we replaced the 2 lp/mm pattern with a 3.94 lp/mm pattern. Per Eq. (5.19) the DOF for the conventional capture should reduce to 12.5 cm. Indeed, our observation matched the predicted value of DOF. FIG. 16 is a synthetic image showing extended capture volume using angular focus stacking. (a) The composite image, (b) focus measure of the composite image. The fine features on the artificial irises and the details on the sinusoidal targets are hard to see in this figure owing to the limited size of the display. Please also see FIG. 16 for zoomed-in view of these regions.

Figure 17:
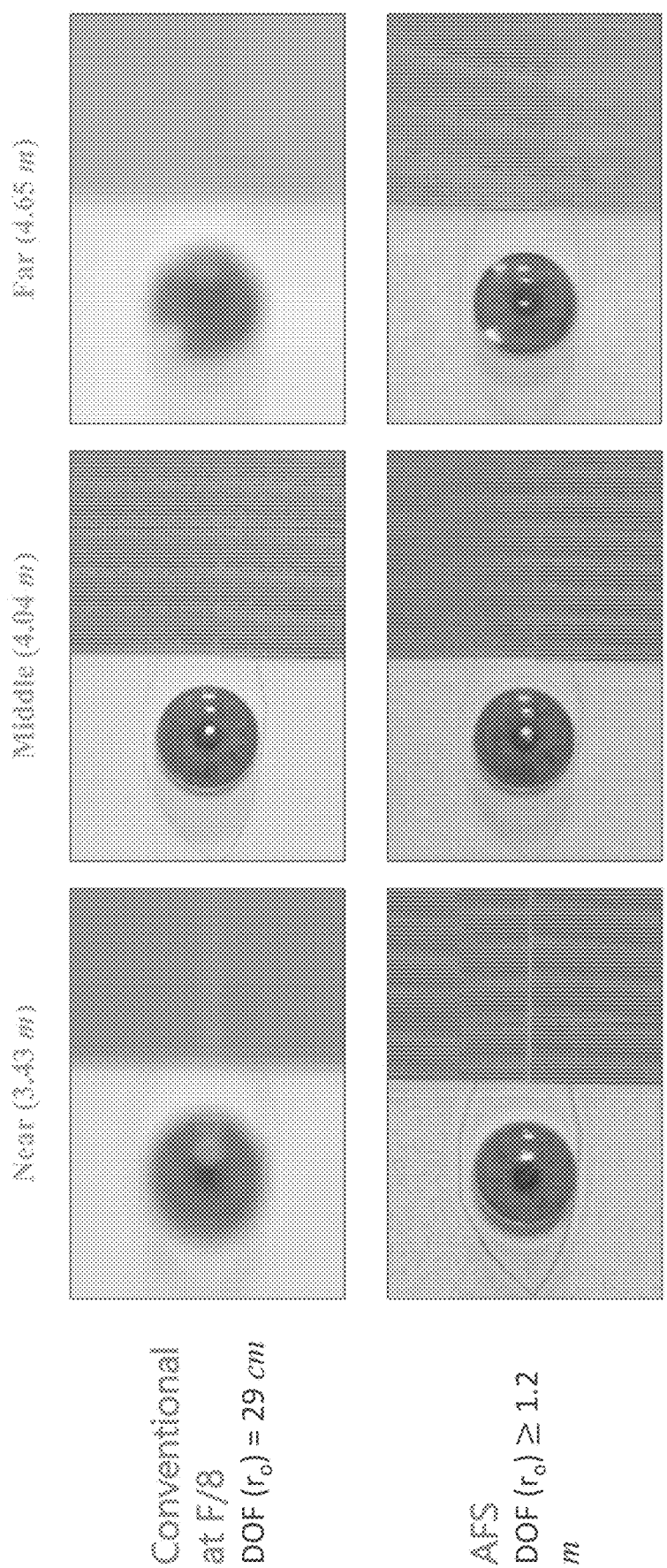
Figure 18:
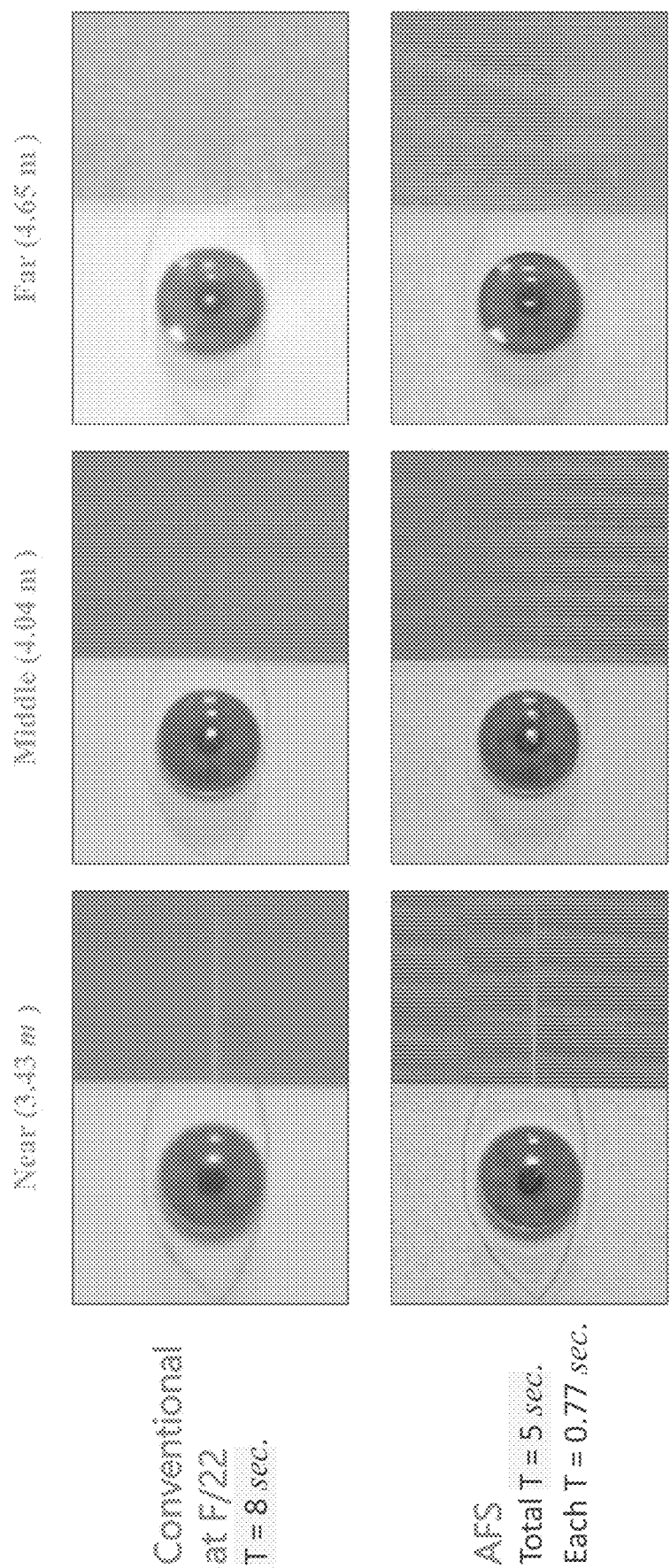
Figure 19:
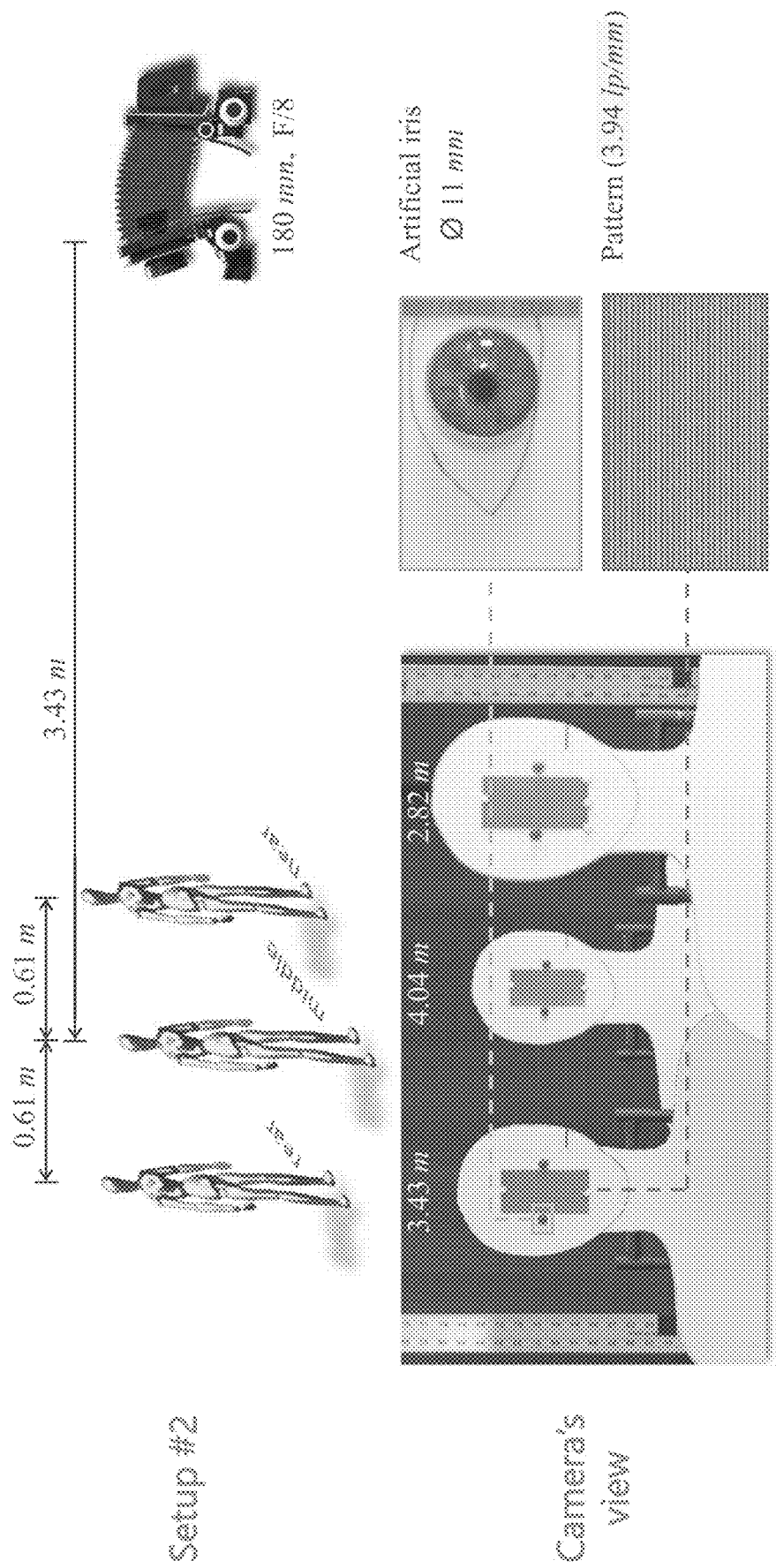
Figure 20:
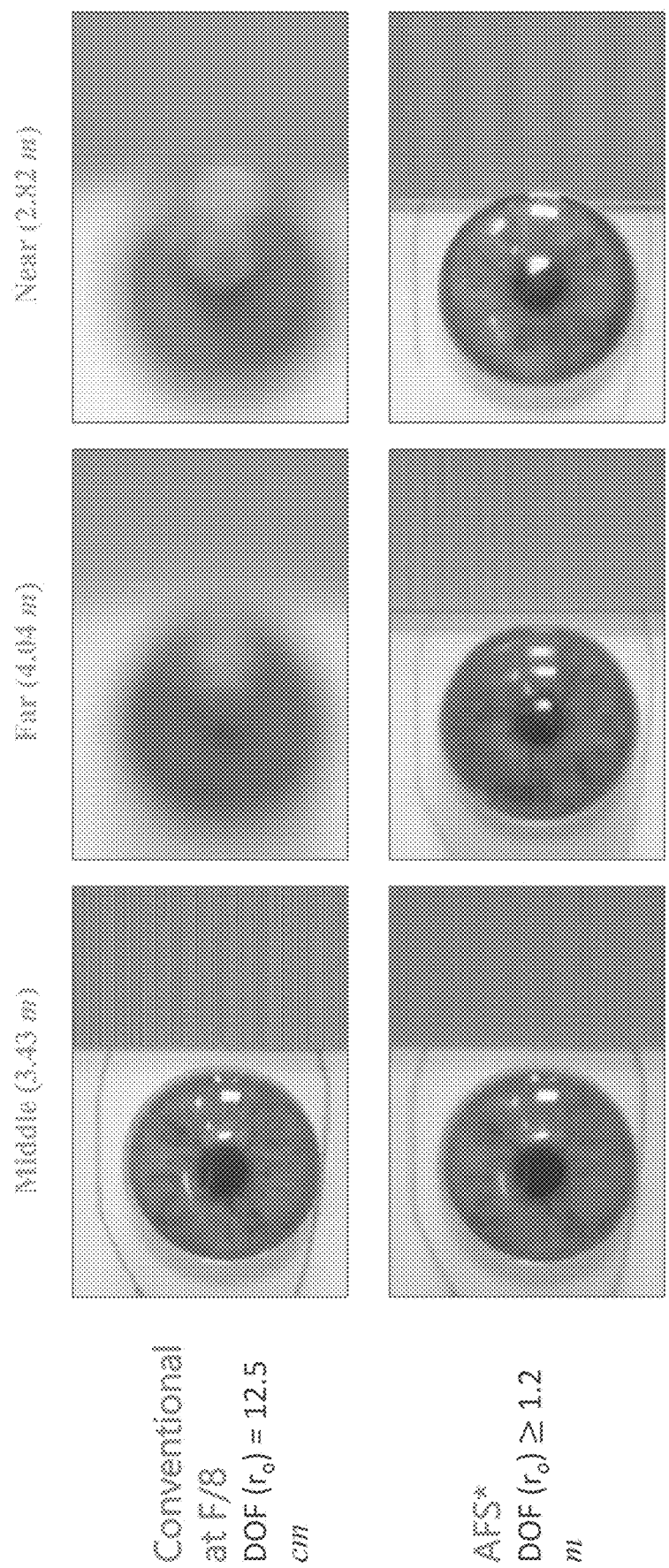

The increase in transverse magnification, also affects the instantaneous DOF of images in the angular focal stack. Therefore, to ensure that we do not leave in "focus holes" within the region of interest, we captured fourteen images, tilting the lens from −14.7° to −19°. To improve our chances of obtaining an adequate image of the high frequency target pattern in the presence of the negating uncertainties, we decided to use the commercial software Heliconfocus for blending the images following registration. FIG. 17 shows a comparison of magnified regions near the eye from the three cutouts between a single-shot conventional image—(a), (b), and (c)—and the composite image obtained using our method. Due to the slight amount of blurring, display size, and aliasing in the portions of images containing the 3.94 lp/mm pattern, the improvements are not clearly visible. However, we can see that the features in the artificial irises are clearly visible from the three cutout figures. Therefore, in this example, we improved the DOF, or axial capture volume, from 125 mm to 1219.2 mm-a factor of 9.8 improvement. FIG. 17 Comparison of magnified patches near the eyes between the conventional image and composite image obtained using angular focus stacking. (a), (b), (c) are the single-shot conventional images of the eye patches in the near, middle and rear cutouts respectively. (d), (e) and (f) are patches from the same areas in the composite image.

We saw that AFS is especially suitable for extending the DOF of iris acquisition systems. We demonstrated the advantages of AFS using two experiments with a Scheimpflug camera. We obtained between 4- and 10-factor of improvements in the axial capture volume over traditional single-shot image capture. At the same time, we showed that the time required for capturing images in the focal stack is much less that the exposure time required using single-shot image capture.

A number of embodiments of the invention have been described. Nevertheless, it will be understood that various modifications may be made without departing from the spirit and scope of the invention.

What is claimed is:

1. A method for operating camera, comprising:
   rotating, about an axis to a plurality of positions, a lens of the camera relative to a sensor of the camera or the sensor of the camera relative to the lens of the camera, wherein the axis is the center of an entrance pupil of the lens, and wherein the rotating generates a rotation of a plane of sharp focus of the camera;
   at each of the plurality of positions, capturing an image;
   registering the captured images using closed form inter-image homography;
   for each image, determining an in-focus region in response to registering the captured images; and
   combining the in-focus regions to generate a composite image.

2. The method of claim 1, wherein the lens has a pupil magnification equal to one.

3. The method of claim 1, wherein the plurality of positions includes at least 10 to 15 different positions.

4. The method of claim 1, wherein the rotating is between about −20° to +20°.

5. The method of claim 1, wherein each of the in-focus regions are within a depth of field of an exactly in-focus region.

6. The method of claim 1, wherein the composite image comprises a three-dimensional map of a scene.

7. The method of claim 1, wherein registering the captured images comprises undoing a shift and scale of the images using the inter-image homography.

8. The method of claim 1, wherein the determining the in-focus region for each image comprises detecting the in-focus region for each image using a Laplacian of Gaussian filter.

9. A non-transitory computer readable medium storing instructions to cause a processor to perform operations comprising:
   rotating, about an axis to a plurality of positions, a lens of a camera relative to a sensor of the camera or the sensor of the camera relative to the lens of the camera, wherein the axis is the center of an entrance pupil of the lens, and wherein the rotating generates a rotation of a plane of sharp focus of the camera;
   at each of the plurality of positions, capturing an image;
   registering the captured images using closed form inter-image homography;
   for each image, determining an in-focus region in response to registering the captured images; and
   combining the in-focus regions to generate a composite image.

10. An apparatus, comprising:
    one or more processors; and
    a non-transitory computer-readable storage medium coupled to the one or more processors and storing programming instructions for execution by the one or more processors, the programming instructions instruct the one or more processors to:
    rotate, about an axis to a plurality of positions, a lens of a camera relative to a sensor of the camera or the sensor of the camera relative to the lens of the camera, wherein the axis is the center of an entrance pupil of the lens, and wherein the rotating generates a rotation of a plane of sharp focus of the camera;
    at each of the plurality of positions, capture an image;
    register the captured images using closed form inter-image homography;
    for each image, determine an in-focus region in response to registering the captured images; and
    combine the in-focus regions to generate a composite image.

* * * * *